(12) United States Patent
Radunovic et al.

(10) Patent No.: US 11,687,390 B2
(45) Date of Patent: *Jun. 27, 2023

(54) RELIABLE VIRTUALIZED NETWORK FUNCTION SYSTEM FOR A CLOUD COMPUTING SYSTEM

(71) Applicant: Microsoft Technology Licensing, LLC, Redmond, WA (US)

(72) Inventors: Bozidar Radunovic, Cambridge (GB); Matthew John Balkwill, Townbridge (GB); Noel Andrew Bainbridge, Cambridge (GB); Yongguang Zhang, Redmond, WA (US); Antonios Katsarakis, Edinburgh (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/390,877

(22) Filed: Jul. 31, 2021

(65) Prior Publication Data

US 2021/0357283 A1 Nov. 18, 2021

Related U.S. Application Data

(63) Continuation of application No. 16/282,183, filed on Feb. 21, 2019, now Pat. No. 11,080,118.

(51) Int. Cl.
*G06F 11/00* (2006.01)
*G06F 11/07* (2006.01)
(Continued)

(52) U.S. Cl.
CPC ...... *G06F 11/0712* (2013.01); *G06F 9/45558* (2013.01); *G06F 9/5072* (2013.01);
(Continued)

(58) Field of Classification Search
CPC ............ G06F 11/0712; G06F 11/203; G06F 11/1484; G06F 11/0709; G06F 11/2012;
(Continued)

(56) References Cited

U.S. PATENT DOCUMENTS

| | | | |
|---|---|---|---|
| 9,356,866 B1* | 5/2016 | Sivaramakrishnan | ...................... H04L 45/586 |
| 2015/0074070 A1* | 3/2015 | Bortnikov | ........... G06F 16/2308 707/703 |

(Continued)

OTHER PUBLICATIONS

Trajano et al., "Two-Phase Load Balancing of In-Memory Key-Value Storages using Network Functions Virtualization (NFV)", In Journal of Network and Computer Applications, vol. 69, May 3, 2016, 13 pages (Year: 2016).*

(Continued)

*Primary Examiner* — Joseph D Manoskey
(74) *Attorney, Agent, or Firm* — Ray Quinney & Nebeker P.C; James Bullough

(57) ABSTRACT

A reliable network function virtualization (rVNF) system includes a virtualized network function (VNF) application instance that includes a plurality of physical VNF instances. A load balancer provides an interface between a client and the VNF application instance. A load balancer interface facilitates delivery of packets related to a particular user context to the same physical VNF instance. A communication interface facilitates communication between the client and the VNF application instance. Application storage stores session data associated with the VNF application instance.

20 Claims, 20 Drawing Sheets

(51) Int. Cl.
*G06F 9/455* (2018.01)
*G06F 9/50* (2006.01)
*G06F 11/20* (2006.01)
*G06F 11/14* (2006.01)

(52) U.S. Cl.
CPC .......... *G06F 9/5077* (2013.01); *G06F 9/5083* (2013.01); *G06F 11/1484* (2013.01); *G06F 11/203* (2013.01); *G06F 2009/45583* (2013.01); *G06F 2009/45595* (2013.01)

(58) Field of Classification Search
CPC .............. G06F 11/2033; G06F 11/301; G06F 9/45558; G06F 9/5072; G06F 9/5077; G06F 9/5083; G06F 2009/45583; G06F 2009/45595; H04L 41/5041; H04L 41/0896
See application file for complete search history.

(56) References Cited

U.S. PATENT DOCUMENTS

| | | | |
|---|---|---|---|
| 2016/0182380 A1* | 6/2016 | Mehra | H04L 47/125 709/226 |
| 2017/0371912 A1* | 12/2017 | Kimura | G06F 16/2365 |
| 2018/0101397 A1* | 4/2018 | Sergeev | G06F 9/45558 |
| 2019/0007320 A1* | 1/2019 | Sukhomlinov | H04L 45/38 |
| 2019/0007321 A1* | 1/2019 | Fedyk | H04L 45/24 |

OTHER PUBLICATIONS

"First Examination Report Issued in Indian Patent Application No. 202117035282", dated Jan. 27, 2023, 6 Pages.

"Office Action Issued in European Patent Application No. 20707966. 6", dated Feb. 8, 2023, 6 Pages.

* cited by examiner

RELIABLE VIRTUALIZED NETWORK FUNCTION SYSTEM FOR A CLOUD COMPUTING SYSTEM

CROSS-REFERENCE TO RELATED APPLICATIONS

This application is a continuation of U.S. patent application Ser. No. 16/282,183 filed on Feb. 21, 2019. The aforementioned application is expressly incorporated herein by reference in its entirety.

BACKGROUND

Network function virtualization (NFV) is an effort to virtualize network services that have traditionally been run on dedicated (and often proprietary) hardware. With NFV, functions like routing, load balancing, and firewalls are packaged as virtual machines (VMs) on commodity hardware. Individual virtualized network functions, or VNFs, are an important component of NFV architecture.

Most of the cellular virtualized network functions (VNFs) maintain a strict separation between the control plane and the data plane. For example, in the 4G cellular control plane, a serving gateway (SGW) and a packet data network gateway (PGW) are examples of data plane functions, whereas a mobility management entity (MME), home subscribe server (HSS), and policy and charging rules function (PCRF) are examples of control plane functions. A similar split is observed in 2G, 3G, and 5G cellular cores, as well in the telephony systems (e.g., IP multimedia subsystem (IMS), voice over LTE (VoLTE)), charging systems, and so forth. This is in contrast with conventional Internet VNFs (or middleboxes), such as network address translation (NAT), firewall, or the like, where a flow is implicitly identified from data packets.

Most cellular VNFs operate on the control plane. They are responsible for setting up and tearing down flows and calls for different applications, managing mobility, charging, authentication, setting up quality of service (QoS), and so forth. One of the main distinct features of a control plane is a relatively low volume of traffic. A mobile device (e.g., a smartphone) typically exchanges a few control messages to set up a data connection, and the data packets then flow through data plane VNFs. Another distinct feature of the control plane is a requirement for high availability. Any temporary failure on a control plane can drop all call attempts during the failure, which will be perceived as failures by the end users. This contrasts with temporary data plane failures from which a typical transport protocol can easily recover.

To achieve high availability, virtualized cellular VNF appliances use special hardware and software and layer 2 (data link layer) networking abstractions. However, many cloud computing systems assume commodity hardware, layer 3 (network layer) networking abstractions, and fully replicated software across multiple failure and update domains. Because of these (and other) differences, it can be difficult to implement a control plane architecture for cellular VNFs in a cloud computing system.

SUMMARY

A reliable virtualized network function (rVNF) system for a cloud computing system is disclosed herein. An rVNF system in accordance with the present disclosure includes a virtualized network function (VNF) application instance that includes a plurality of physical VNF instances. A load balancer provides an interface between a client and the VNF application instance. A load balancer interface facilitates delivery of packets related to a particular user context to the same physical VNF instance. A communication interface facilitates communication between the client and the VNF application instance. Application storage stores session data associated with the VNF application instance.

DETAILED DESCRIPTION

The present disclosure is generally related to a control plane architecture that can achieve high availability and reliability on top of cloud computing platform abstractions. In accordance with one aspect of the present disclosure, a reliable VNF (rVNF) system implements a load balancer (LB) interface that provides custom application layer load balancing for various protocols sitting on top of standard transport layer protocols. This facilitates replicated application storage design, as will be discussed later.

An rVNF system in accordance with the present disclosure may also include a communication interface, which may facilitate communication via HTTP, REST, or the like. The communication interface may be replicated and reliable so that any packet that is received and acknowledged may be stored in a reliable storage and accessible by any of the physical VNF instances.

An rVNF system in accordance with the present disclosure may also provide fast, replicated application storage. The application storage may take the form of a key-value store (KVS), which may be referred to herein as rVNF KVS. This KVS may be designed to interface with existing VNF-type applications that are written with standard operating system (OS) locks for a multi-process/multi-thread environment. The application storage may also rely on standard memory APIs for allocating and freeing chunks of memory.

Figure 1:
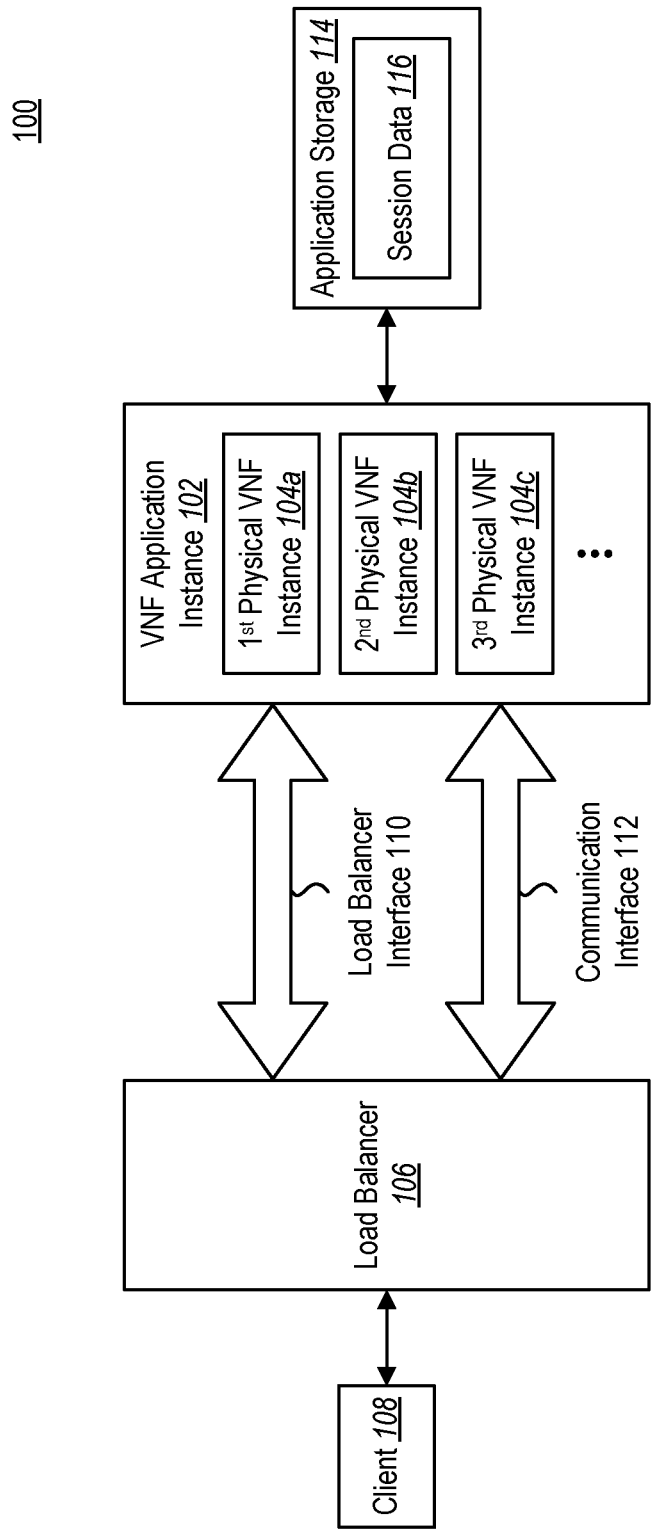
FIG. 1 illustrates an example of a reliable VNF (rVNF) system in accordance with the present disclosure.

FIG. 1 illustrates an example of an rVNF system 100 in accordance with the present disclosure. The rVNF system 100 is configured to be implemented in a cloud computing system. The rVNF system 100 includes a virtualized network function (VNF) application instance 102, which may implement one or more functions associated with a cellular control plane. The VNF application instance 102 includes a plurality of physical VNF instances 104a-c. The physical VNF instances 104a-c may be, for example, virtual machines (VMs), containers, or combinations thereof.

The rVNF system 100 also includes a load balancer 106 that provides an interface between a client 108 and the VNF application instance 102. The client 108 may be any entity that communicates with the VNF application instance, such as another VNF or a user device.

A load balancer (LB) interface 110 facilitates delivery of all packets related to a particular user context to the same physical VNF instance. For example, if the first received packet related to a particular user context is initially delivered to the second physical VNF instance 104b, the LB interface 110 ensures that subsequent packets related to that same user context are also delivered to the second physical VNF instance 104b. The LB interface 110 may be referred to herein as an rVNF LB.

A communication interface 112 may may facilitate communication via HTTP, REST, or the like. In some embodiments, the communication interface 112 may implement a virtualized transport protocol that shares states and functionality across different physical VNF instances 104a-c. In some embodiments, the communication interface 112 may include a socket interface, which may be referred to herein as rVNF sockets.

The rVNF system 100 also includes storage 114, which may be referred to herein as application storage 114. The application storage 114 stores session data 116 associated with the VNF application instance 102. As will be discussed in greater detail below, in some embodiments the application storage 114 may be implemented as a transactional key-value store (KVS), which may be referred to herein as rVNF KVS.

For simplicity, the rVNF system 100 shown in FIG. 1 includes a single VNF application instance 102. However, an rVNF system in accordance with the present disclosure may include a plurality of VNF application instances 102. Each VNF application instance 102 may have its own instance of the load balancer 106 and its own instance of the application storage 114. The load balancer 106 and the application storage 114 may be implemented as distributed software running on top of multiple virtual machines (VMs) for scalability and reliability.

Figure 2:
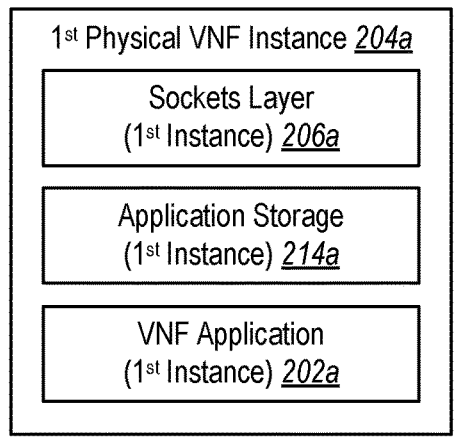
FIG. 2 illustrates a load balancer and application storage replicated on a plurality of physical VNF instances.
Figure 2:
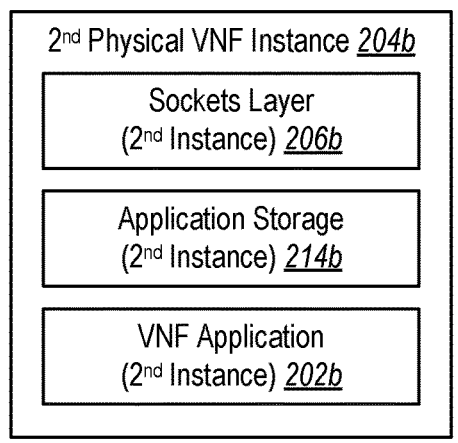
Figure 2:
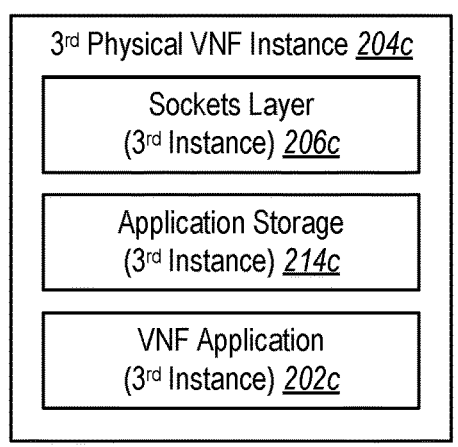

To facilitate reliability, the load balancer and the application storage may be replicated on the physical VNF instances. The VNF application instance may also be replicated. This is illustrated in FIG. 2, which shows a first physical VNF instance 204a, a second physical VNF instance 204b, and a third physical VNF instance 204c. The first physical VNF instance 204a includes a first instance of the load balancer 206a, a first instance of the application storage 214a, and a first instance of the VNF application 202a. The second physical VNF instance 204b includes a second instance of the load balancer 206b, a second instance of the application storage 214b, and a second instance of the VNF application 202b. The third physical VNF instance 204c includes a third instance of the load balancer 206c, a third instance of the application storage 214c, and a third instance of the VNF application 202c.

As indicated above, the LB interface facilitates delivery of all packets related to a particular user context to the same physical VNF instance. An example of this will be discussed in relation to the LB interface 310 shown in FIG. 3.

The LB interface 310 may include storage 318, which may be referred to herein as LB storage 318. Packets that arrive at the LB interface 310 may include metadata that identifies a particular user context. The LB storage 318 may include associations between metadata that is included in received packets and particular physical VNF instances. The LB storage 318 may be non-transactional (in contrast to the application storage 114, which is transactional as will be discussed below).

In response to receiving an incoming packet 320, the LB interface 310 parses the incoming packet 320 and extracts metadata from the incoming packet 320. The LB interface is shown with a parsing component 322 for providing this functionality. The LB interface 310 then searches for the metadata in the LB storage 318. If the search is successful and the metadata is found in the LB storage 318, then the LB interface 310 identifies the physical VNF instance that is associated with the metadata in the LB storage 318 and forwards the incoming packet 320 to the identified physical VNF instance. If, however, the search is unsuccessful and the metadata is not found in the LB storage 318, then the LB interface 310 identifies a physical VNF instance that should receive the incoming packet 320 based on other criteria, such as load information associated with the physical VNF instances (e.g., which physical VNF instance has the most capacity). The LB interface 310 then forwards the incoming packet 320 to the identified physical VNF instance and associates the metadata with the identified physical VNF instance in the LB storage 318.

In some embodiments, the LB interface 310 may search for the metadata or a subset of the metadata in the LB storage 318. In other words, different subfilters may be applied in connection with searching for the metadata in the LB storage 318. For example, an attempt may initially be made to match srcIP:srcPort, dstIP:dstPort. If that fails an attempt may be made to match *:*, dstIP:dstPort (where * means any). If that fails, then other criteria may be used to select a physical VNF instance that should receive the incoming packet 320, as discussed above.

In the depicted example, the metadata within the incoming packet is shown as metadata1. The LB interface 310 parses the incoming packet 320 and extracts metadata1 from the incoming packet 320. The LB interface 310 then searches for metadata1 in the LB storage 318. In the depicted example, the LB storage 318 includes a record 324a that associates metadata1 with the first physical VNF instance 304a. Upon finding the record 324a, the LB interface 310 identifies the physical VNF instance that is associated with metadata1, which is the first physical VNF interface 304a in this example. The LB interface 310 then forwards the incoming packet 320 to the first physical VNF instance 304a.

On the other hand, if the record 324a that associates metadata1 with the first physical VNF instance 304a did not exist and the search for metadata1 is unsuccessful, then the LB interface 310 would choose one of the physical VNF instances 304a-c to receive the incoming packet 320. If the LB interface 310 chooses the first physical VNF interface 304a, the LB interface 310 would forward the incoming packet 320 to the first physical VNF interface 304a and associate metadata1 with the first physical VNF instance 304a in the LB storage 318 (e.g., by creating the record 324a shown in FIG. 3).

Figure 3:
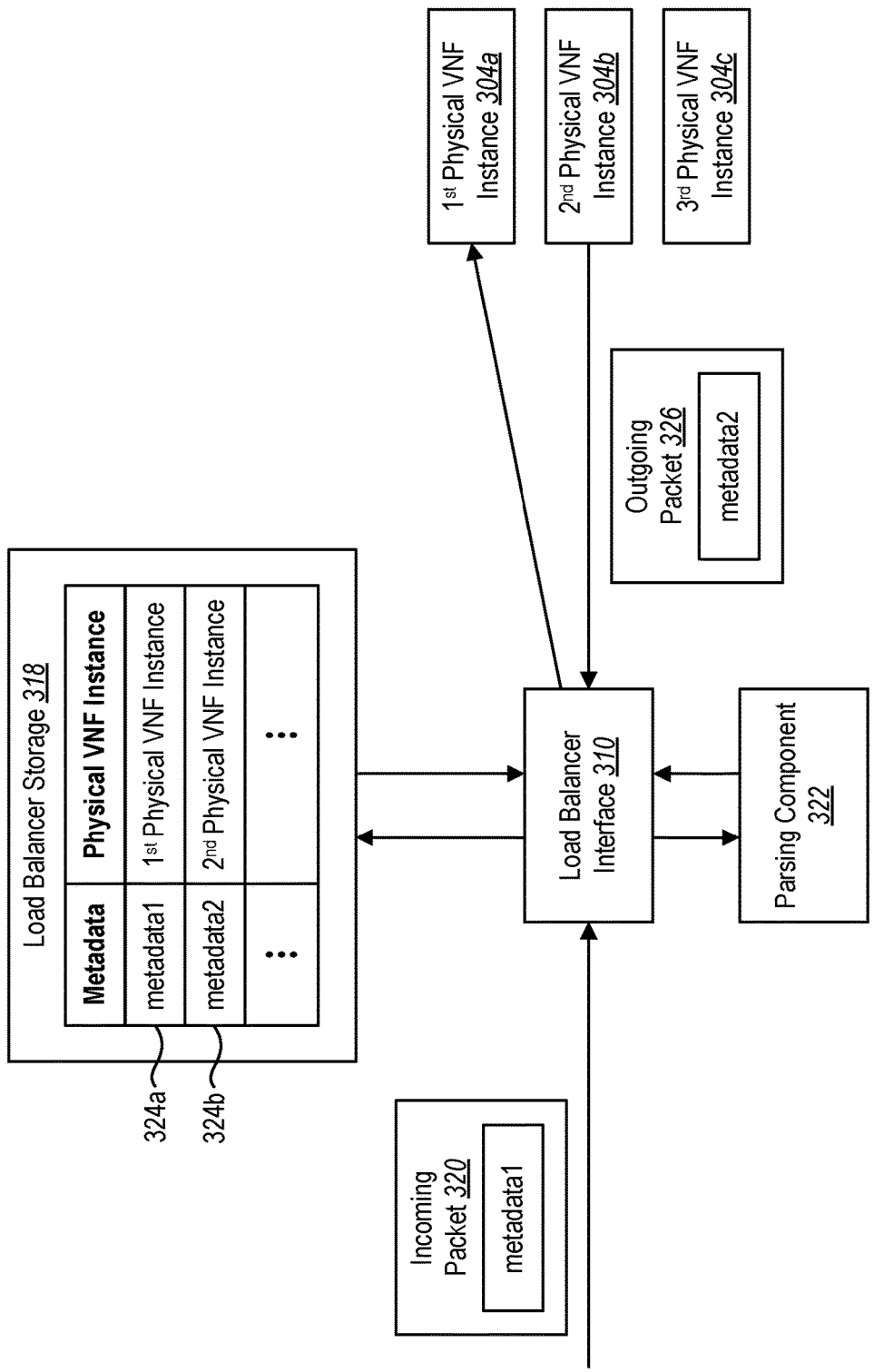
FIG. 3 illustrates an example showing how a load balancer interface may facilitate delivery of all packets related to a particular user context to the same physical VNF instance.

The physical VNF instances 304a-c may be capable of inserting routing entries into the LB storage 318. For example, FIG. 3 shows the second physical VNF instance 304b sending an outgoing packet 326. The metadata within the outgoing packet 326 will be referred to as metadata2. The second physical VNF instance 304b may create a record 324b in the LB storage 318 that associates metadata2 with the second physical VNF instance 304b. This indicates to the LB interface 310 that future incoming packets that include metadata2 should be routed to the second physical VNF instance 304b.

Figure 4A:
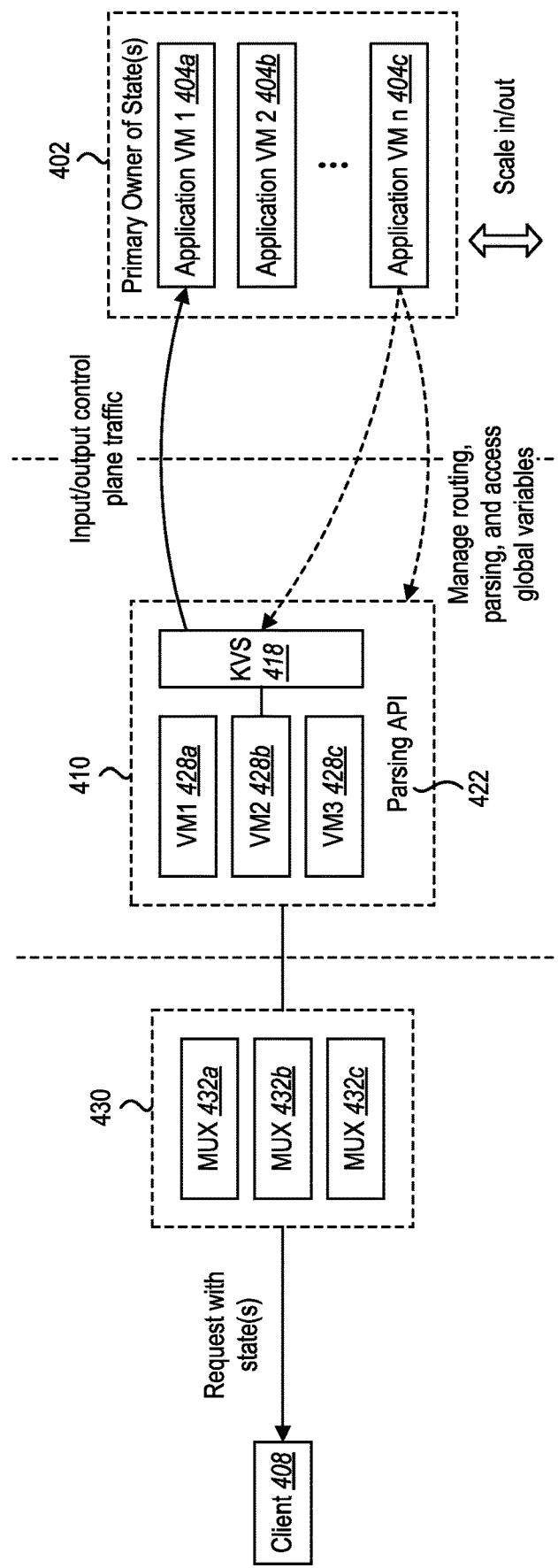
FIGS. 4A-B illustrate another example of a load balancer interface.
Figure 4B:
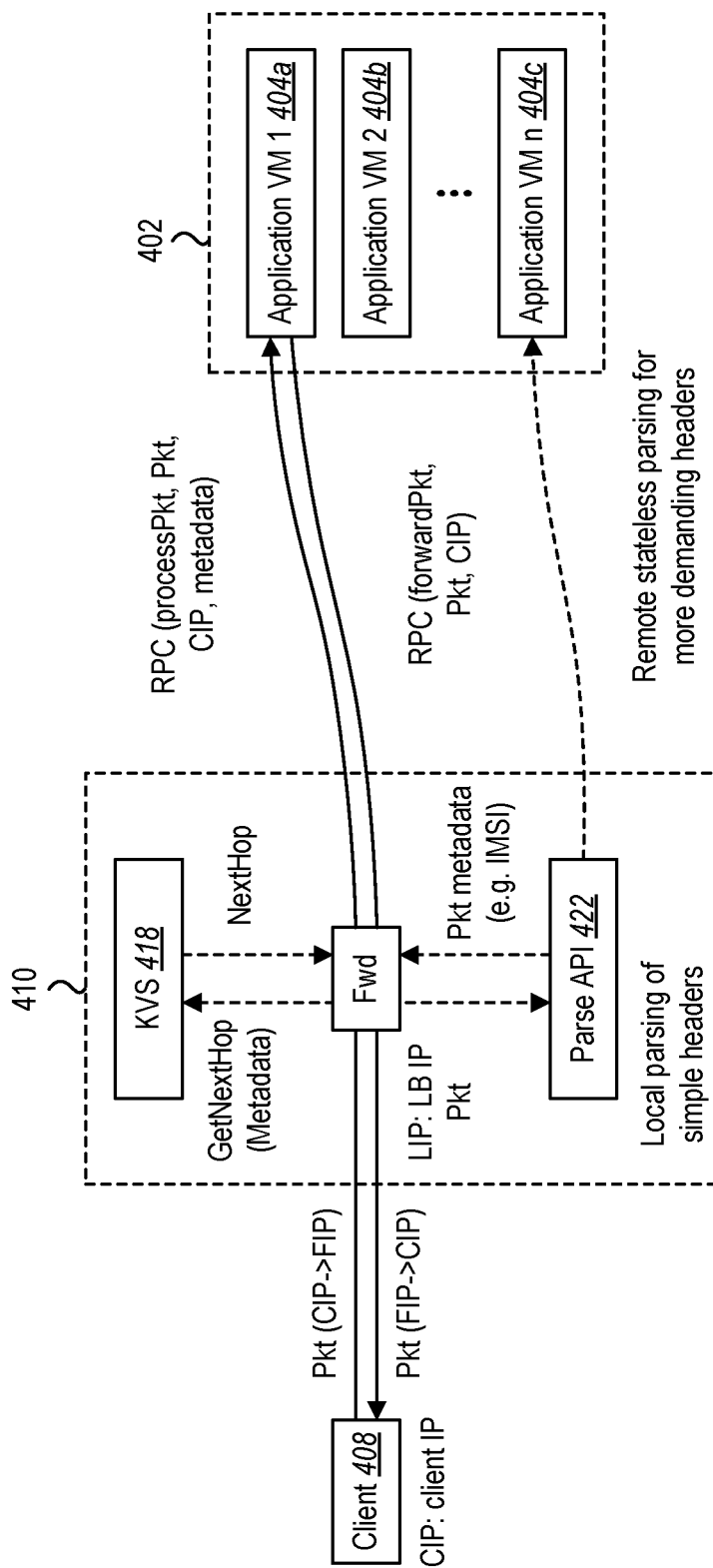

FIGS. 4A-B illustrate another example of an LB interface 410. Reference is initially made to FIG. 4A, which shows the LB interface 410 implemented using a plurality of virtual machines (VMs) 428a-c. The LB VMs 428a-c receive all VNF network traffic shared across them. The LB interface 410 includes a key-value store (KVS) 418, which is an example of the LB storage 318 shown in FIG. 3. The KVS 418 may be non-transactional. The LB interface 410 also includes a parsing application programming interface (API) 422, which is an example of the parsing component 322 shown in FIG. 3. In the depicted example, communication between the LB interface 410 and the client 408 occurs via a cloud computing system LB 430, which includes a plurality of multiplexers 432a-c. Alternatively, communication between the LB interface 410 and the client 408 could occur via an edge instance with multiplexers. A VNF application instance 402 is shown with a plurality of application VMs 404a-c, which are examples of the physical VNF instances 304a-c shown in FIG. 3.

FIG. 4B illustrates how an incoming packet may be processed by the LB interface 410. The parsing API 422 extracts metadata from an incoming packet. The parsing API 422 allows VNF application developers to insert a simple stateless function to process an incoming packet and extract some metadata out of it, in a form of a single string. This could be as simple as extracting a 5 tuple to as complicated as parsing 3GPP protocol headers. The parsing function returns the packet with the extracted metadata.

If the metadata is already associated with a particular application VM in the KVS 418, then the metadata is forwarded to that application VM. Otherwise, the LB interface 410 selects one of the application VMs 404a-c to receive the packet and associates the metadata with that application VM in the KVS 418. The application VMs 404a-c are also capable of inserting routing entries into the KVS 418.

As indicated above, a socket interface in accordance with the present disclosure implements a virtualized transport protocol that shares states and functionality across different physical VNF instances. Transport protocol abstractions often provide packet retransmission, congestion control and other features, which involve keeping some state information for each connection. In known implementations, this is commonly done in the operating system kernel and is difficult to access. Consequently, when the corresponding VM fails, the connection state is lost and the connection is dropped, which can cause visible negative consequences on the control plane performance.

An rVNF socket interface in accordance with the present disclosure provides a reliable socket API for VNF application instances. An rVNF socket interface may keep explicit control of the transport protocol state and replicate it across rVNF socket VM instances for reliability. For purposes of example, three transport protocols will be discussed: User Datagram Protocol (UDP), Stream Control Transmission Protocol (SCTP), and Transmission Control Protocol (TCP).

UDP is a stateless protocol, and as a result it is not necessary to store any UDP-related state per connection. However, the overlay protocol may implement some of the retransmission and failure detection functionality.

Unlike UDP, SCTP stores per-connection state, which contains among other things the sequence numbers of packets in flight and congestion window sizes for different associations (paths). A socket interface in accordance with the present disclosure may replicate the entire SCTP protocol state after each SCTP operation (e.g., packet reception/transmission, timeout).

Figure 5:
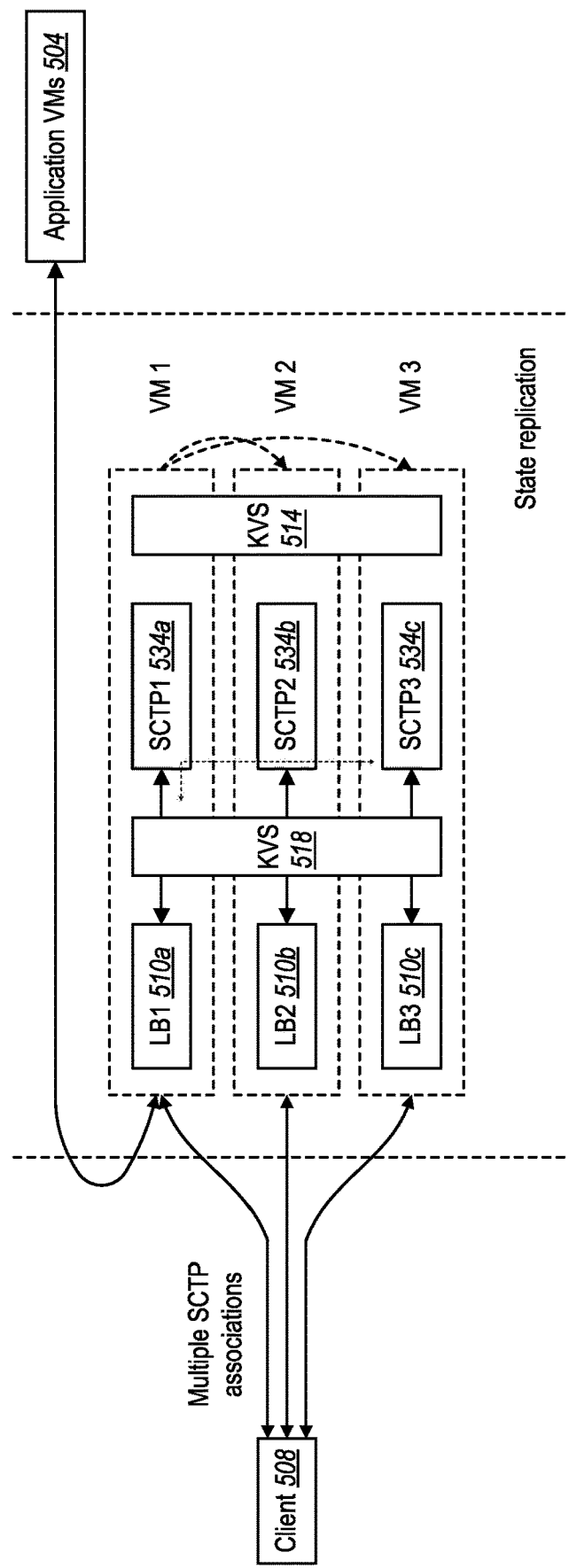
FIG. 5 illustrates aspects of a socket interface in accordance with the present disclosure that may be used in connection with the SCTP protocol.

FIG. 5 illustrates aspects of a socket interface in accordance with the present disclosure that may be used in connection with the SCTP protocol. As indicated above, an rVNF system in accordance with the present disclosure provides an interface between a client 508 and a VNF application instance, which in the depicted example includes a plurality of application VMs 504. The socket interface includes a plurality of instances of a transport protocol application, which in the depicted example are represented as SCTP instances 534a-c. The transport protocol (SCTP) state is replicated across the SCTP instances 534a-c using the transactional KVS 514 and the non-transactional KVS 518. A plurality of LB interfaces 510a-c are shown in communication with the SCTP instances 534a-c.

A particular SCTP instance receives packets from a corresponding LB interface. For example, the first SCTP instance 534a receives packets from the first LB interface 510a. The first SCTP instance 534a uses the transactional KVS 514 (which is an example of the application storage 114 shown in FIG. 1, and which will be discussed in greater detail below) for data replication. The LB interfaces 510a-c multiplex packets to different SCTP instances 534a-c based on the metadata in the packets so that all packets from the same flow are delivered to the same SCTP instance. The SCTP instances 510a-c also access the KVS 518 (which is an example of the LB storage 318 shown in FIG. 3) to access a small amount of state shared across all flows.

In some embodiments, each of the LB interfaces 510a-c announces its own IP address rather than going through a multiplexer. This makes it possible for the client 508 to explicitly manage failovers across different IP addresses. In some embodiments, once a particular LB interface receives an SCTP packet, the LB interface forwards the packet to one of the user-mode SCTP instances 534a-c, which may be running on the same VM or a different VM.

In response to receiving a packet from an LB interface, an SCTP instance processes the packet, updates the flow state, and sends any responses back to the LB interface. The responses may include network packets and application socket responses. An example of a network packet response is an acknowledgement (ACK) sent to the other SCTP endpoint. An example of an application socket response is a newly received SCTP packet that has to be delivered to the application through the socket API. Network packets are forwarded back to the LB interface, which transmits the network packets over the network. Application socket packets are also forwarded back to the LB interface, where they are processed in the same way as received UDP datagrams: a parse API is run on a packet to determine the destination, and the packet is then forwarded to it.

The API between the socket interface and the application VMs 504 may be different from standard sockets in that it may allow for a reliable packet delivery. An application VM 504 can peek a packet from the socket interface, and once the processing is done, the application VM 504 can delete the packet through a separate API call. This allows for an extra reliability. If an application VM 504 fails before processing the entire packet, another application VM 504 will be able to fetch the same packet and resume processing.

The TCP architecture may be substantially similar to the SCTP architecture. One exception is that the TCP architecture may include multiplexers or a Border Gateway Protocol (BGP) speaker to provide the same IP address to all instances of the LB interface, since standard TCP only supports one IP address.

Figure 6:
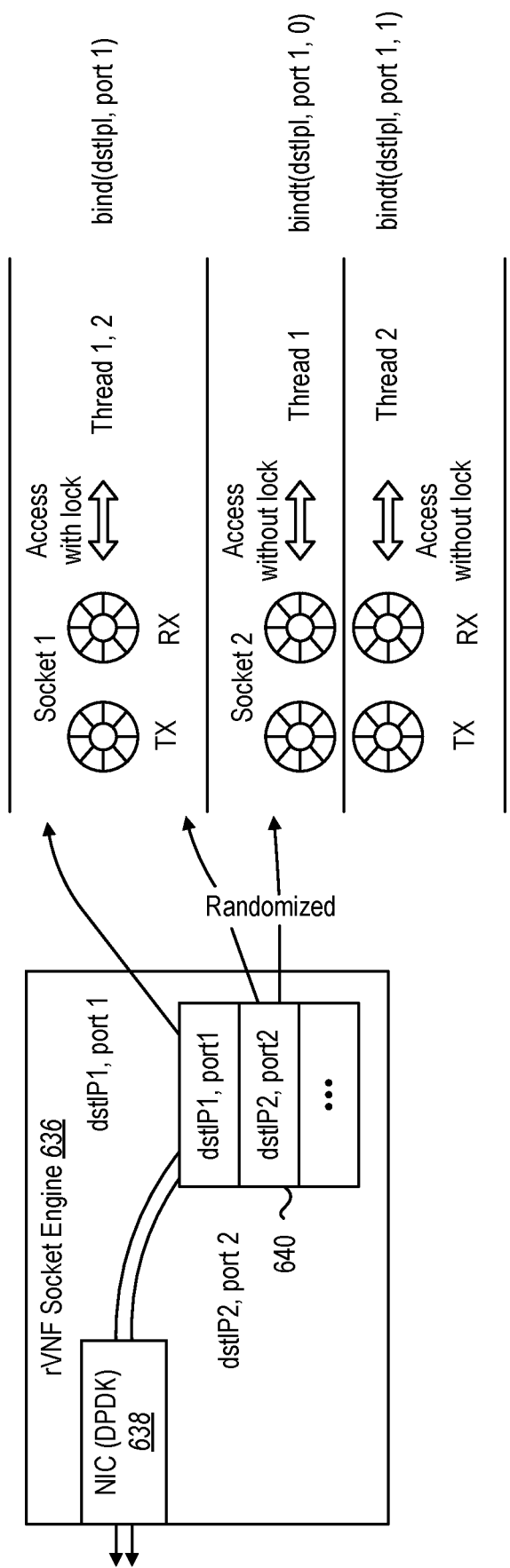
FIG. 6 illustrates an example of a general socket architecture that may be utilized by a socket interface in accordance with the present disclosure.

FIG. 6 illustrates an example of a general socket architecture that may be utilized by a socket interface in accordance with the present disclosure. A VNF application instance runs an rVNF socket engine 636 in one or more threads. An application registers a socket using standard socket interfaces. In particular, when the application issues a socket bind request, this request creates circular queues for the new socket, one for transmission and one for reception, and adds socket metadata (e.g., source and destination IP address, source and destination port and protocol ID) in a local lookup table 640. Afterwards, when a new packet arrives, the packet is placed in the corresponding reception queue. Each packet placed in the transmission queue (by an application invoking socket send( )) is transmitted over the network interface card (NIC) 638.

In some embodiments, a socket interface may support a multi-threaded lockless version of a socket where multiple threads can bind to the same socket tuple. The rVNF socket engine 636 then creates multiple independent queue pairs for the socket and distributes received packets for that socket randomly and equally across the queues. The rVNF socket engine 636 also collects packets for transmission from both queues.

Figure 7:
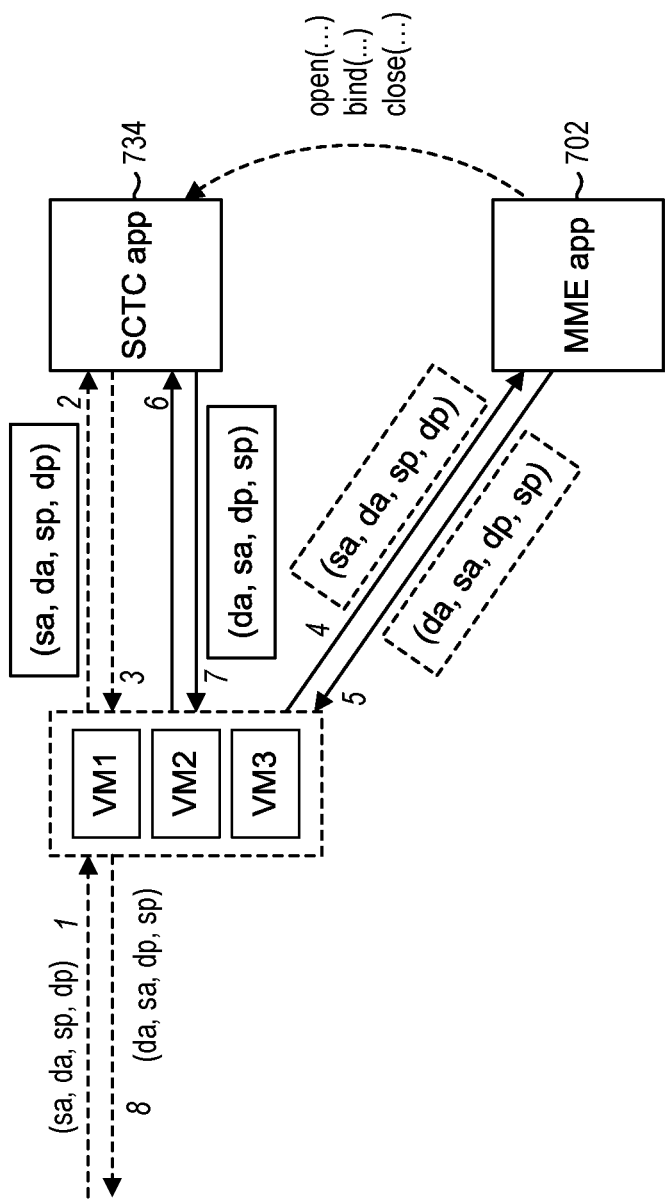
FIG. 7 illustrates message exchange for an SCTP socket example.

FIG. 7 illustrates message exchange for an SCTP socket example. This example will be discussed in relation to an SCTP application 734 and a Mobility Management Entity (MME) application 702. The MME application 702 is an example of a VNF application.

In FIG. 7, tunnelled packets are in rectangles. The rectangles with solid lines represent one tunnel, whereas the rectangles with dotted lines represent another tunnel. Reliable messages are represented using solid lines, whereas unreliable messages are represented using dotted lines.

Consider an SCTP packet with source address SA, destination address DA, source port SP and destination port DP arriving at one of the LB VMs (packet 1). This packet will then be tunnelled and forwarded to an instance of the SCTP application (packet 2). SCTP then performs the SCTP operation and forwards the received datagram, with the same header, to the LB (packet 3), which then gets forwarded to an instance of the MME app (packet 4), the later using a different tunnel. A response from MME will be forwarded to any LB instance (packet 5) and then to an appropriate SCTP instance, based on the routing KVS (packet 6). After performing SCTP operation(s) on the packet, the SCTP application will forward it to any LB instance (packet 7) and further to the destination (packet 8). Return packets can be further merged into one transmission (5 and 6, 7 and 8), and LB selection can be randomized based on load. Also, all transmissions in FIG. 7 can be done over shared memory queues instead of a network, in case an application is collocated with an LB instance.

The term "5G" refers to the latest set of cellular mobile communications standards. 5G standards extensively use RESTful interfaces. The term REST, which stands for Representational State Transfer (REST), is a software architectural style that defines a set of constraints to be used for creating web services. Web services that conform to the REST architectural style may be referred to as RESTful web services. RESTful web services allow requesting systems to access and manipulate representations of web resources by using a uniform and predefined set of stateless operations. In embodiments where RESTful interfaces are being used, a RESTful API may be virtualized as a separate application, similarly to the way that SCTP was virtualized (as discussed above).

Figure 7A:
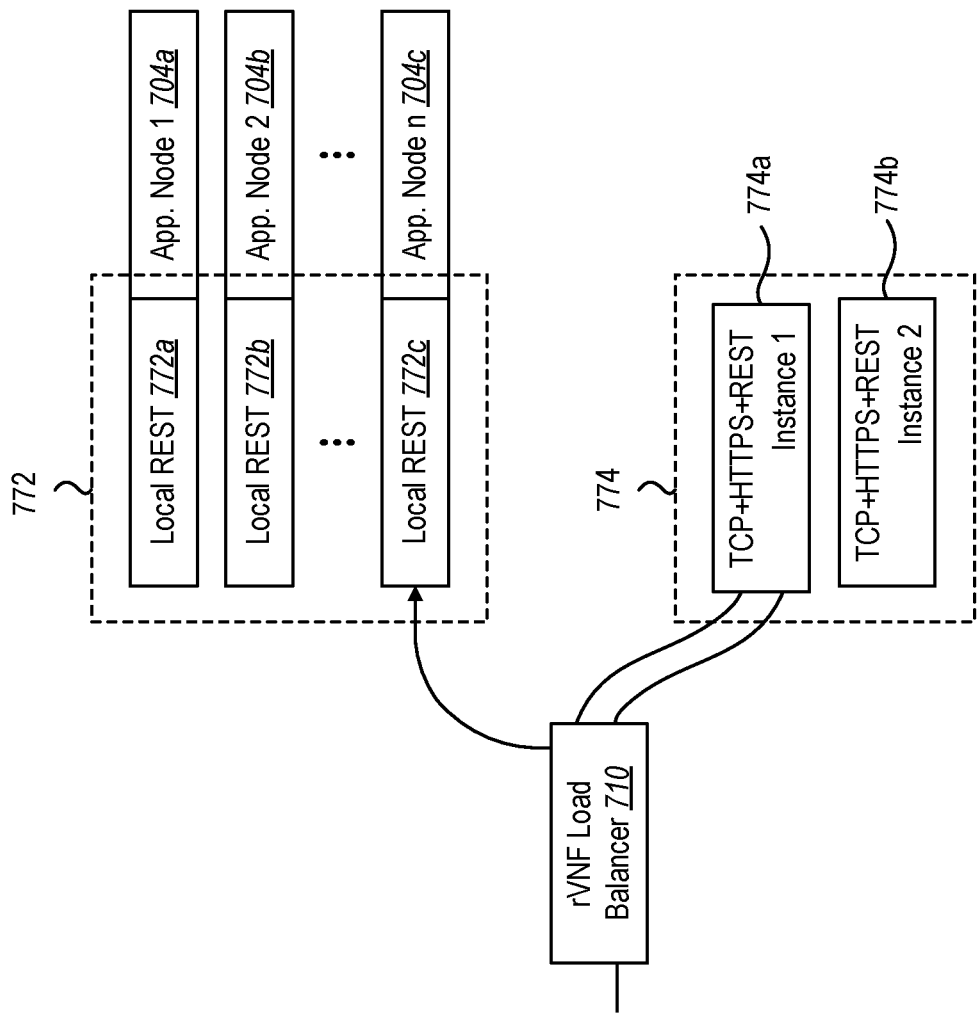
FIG. 7A illustrates an example of a virtualized RESTful API.

Referring to FIG. 7A, an rVNF LB 710 may forward incoming packets to a RESTful application 774. FIG. 7A shows a plurality of instances 774a-b of the RESTful application 774. The rVNF LB 710 may use metadata (such as an IP tuple) for forwarding to make sure that one TCP connection always lands on the same instance of the RESTful application 774. The RESTful application 774 receives and removes headers (e.g., TCP and HTTPS headers), extracts the plain REST request, potentially extracts required metadata from the REST message, and forwards the REST request to one of the VNF application nodes 704a-c through the rVNF LB 710. The rVNF LB 710 uses metadata supplied by the RESTful application 774 to forward the packets to the correct one of the VNF application nodes 704a-c.

In accordance with at least some embodiments, the RESTful application 774 itself is not replicated. If one or more instances 774a-b of the RESTful application 774 fail, a connection may simply be reopened.

FIG. 7A also shows a shared RESTful layer abstraction 772, which includes a plurality of instances 772a-c of a local RESTful application. These RESTful application instances 772a-c run on the VNF application nodes 704a-c.

As indicated above, application storage stores session data associated with a VNF application instance. In some embodiments, the application storage takes the form of a key-value store (KVS) that includes a plurality of key-value pairs.

Figure 7B:
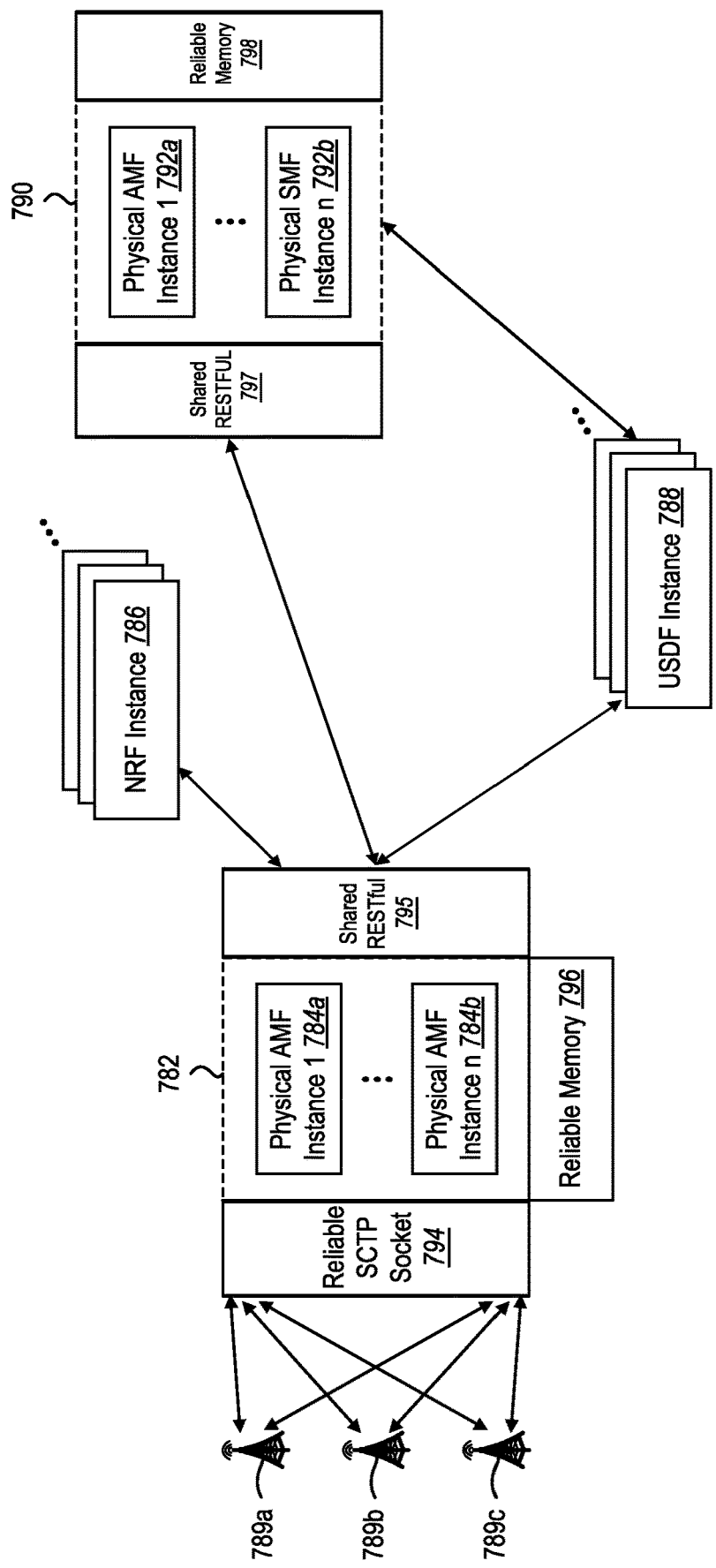
FIG. 7B illustrates an example of a system that may utilize a virtualized RESTful API.

FIG. 7B illustrates an example of a system that may utilize a virtualized RESTful API. The system includes a logical instance of an access and mobility management function (AMF) 782, which may be implemented using a plurality of physical AMF instances 784a-b. The AMF 782 may also include a reliable SCTP socket layer 794, a shared RESTful layer abstraction 795, and reliable memory 796. The system also includes a plurality of network repository function (NRF) instances 786 and a plurality of unstructured data storage network function (UDSF) instances 788. The system includes a logical instance of a session management function (SMF) 790, which may be implemented using a plurality of physical SMF instances 792*a-b*. The SMF 790 includes a shared RESTful layer abstraction 797 and reliable memory 798.

The reliable SCTP socket layer 794 makes it possible for nodes (e.g., base stations 789*a-c*) within a wireless communication system to connect to the AMF 782 via multiple IP addresses, across different access links, and to different VMs. The AMF logical instance 782 and the SMF logical instance 790 may be implemented so that they are stateful and fast (e.g., using local reads/writes). In some embodiments, only persistent data is backed up. There may be an HTTP connection between the shared RESTful layer abstraction 795 within the AMF 782 and the shared RESTful layer abstraction 797 within the SMF 790. This HTTP connection may be re-established on scaling and/or failure. The session state may be locally replicated at both the AMF 782 and the SMF 790. With respect to the interface between the shared RESTful layer abstraction 795 within the AMF 782 and the NRF instances 786, a slice search returns a single logical SMF address.

In some embodiments, the application storage is a transactional KVS. A transaction may be defined by an application. During a transaction, an application can issue a number of reads and writes to key-value pairs. Once the transaction is committed, these reads and writes are updated atomically, or the transaction is rolled back if that is not possible.

In some embodiments, each value can have a different size. This makes a KVS in accordance with the present disclosure more flexible than a conventional KVS. In some embodiments, each key may take the form of a memory address. A value corresponding to a particular key may be stored in a section of memory corresponding to a memory address that the key represents.

In some embodiments, the KVS implements a primary-backup design principle in which each key has only one physical VNF instance as an owner at any given time, and only the owner of a key is permitted to access the key and a value corresponding to the key. In other words, only the owner of a key can read or write to that key. If another physical VNF instance wants to perform an operation on the key, the physical VNF instance has to first become an owner of the key.

One of the benefits of the primary-backup design is that if all requests for the same set of keys are processed on the same physical VNF instance, the transactions are entirely local and very efficient. All reads and writes are local, and the physical VNF instance transmits the modified key-value pairs to designated backup physical VNF instances once at the end of a transaction.

Figures 8A, 8B:
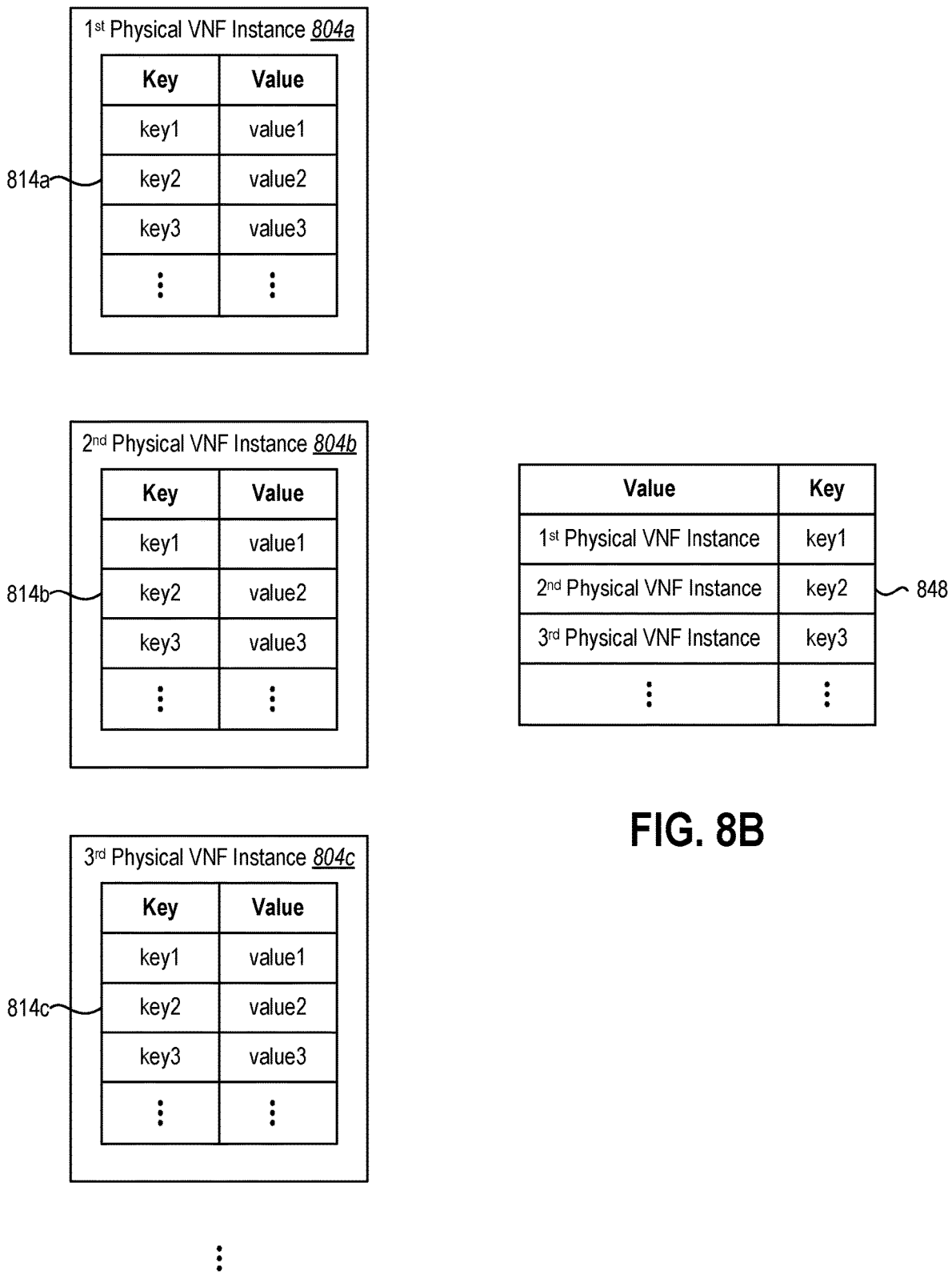
FIGS. 8A-D illustrate aspects of a primary-backup design principle that may be implemented in a transactional key-value store.

An example of the primary-backup design principle will be discussed in relation to FIGS. 8A-D. Reference is initially made to FIG. 8A, which shows a KVS replicated across a plurality of physical VNF instances 804*a-c*. In particular, a first physical VNF instance 804*a* includes a first instance of the KVS 814*a*. A second physical VNF instance 804*b* includes a second instance of the KVS 814*b*. A third physical VNF instance 804*c* includes a third instance of the KVS 814*c*.

FIG. 8B shows an owner table 848 that identifies the owner of each key in the KVS. In the depicted example, the first physical VNF instance 804*a* is the owner of key1, the second physical VNF instance 804*b* is the owner of key2, the third physical VNF instance 804*c* is the owner of key3, and so forth.

Figures 8C, 8D:
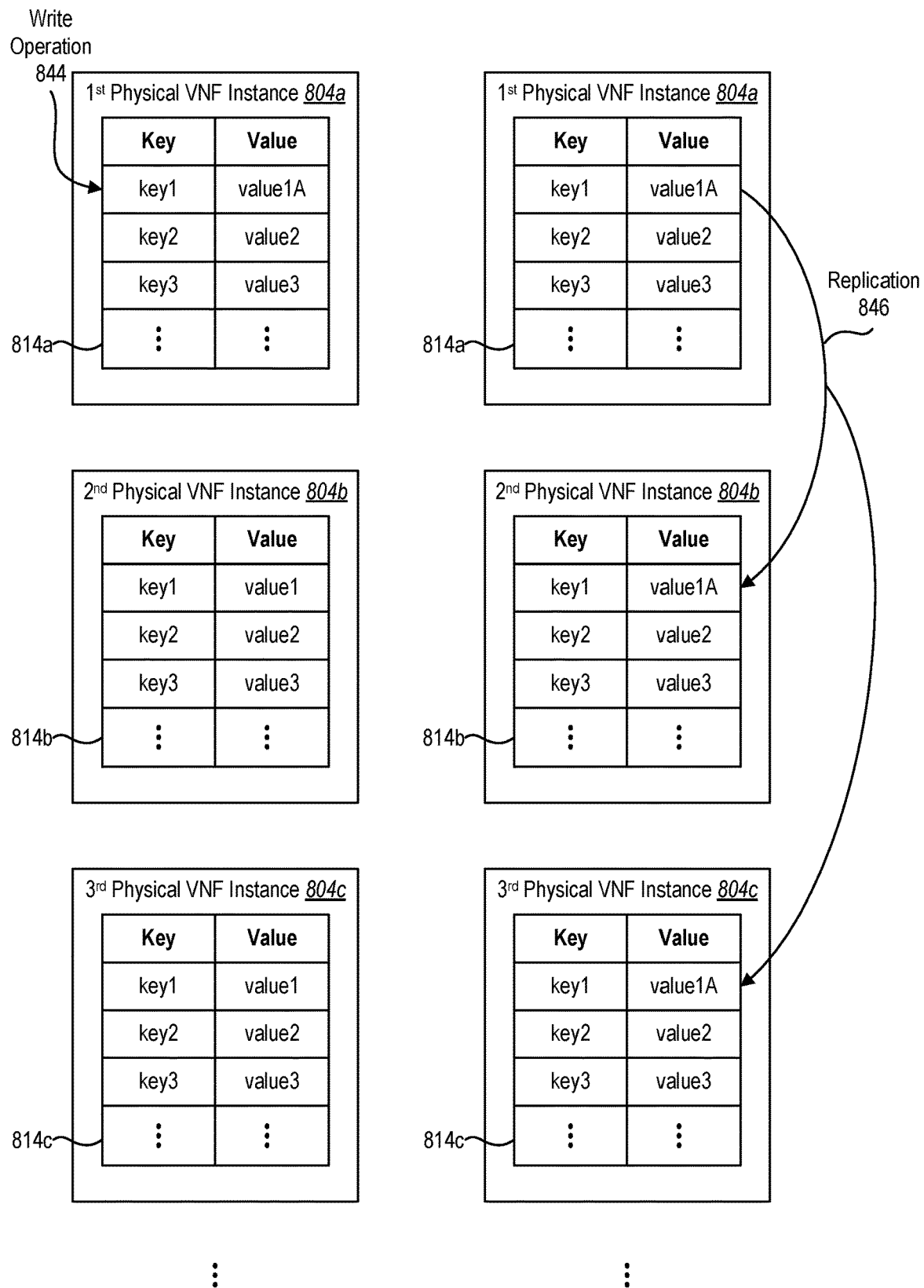

Reference is now made to FIG. 8C. Suppose that the first physical VNF instance 804*a* performs a write operation 844 to the key-value pair that includes key1. The write operation 844 changes value1 to value1A. Only the first physical VNF instance 804*a* is able to perform the write operation 844 at this point, because the first physical VNF instance 804*a* is the owner of key 1.

When the owner of a particular key performs a write operation to a key-value pair, the write operation is then replicated to other instances of the KVS as backups. For example, referring now to FIG. 8D, after the write operation 844 has been performed on the first instance of the KVS 814*a*, the a replication 846 of the write operation 844 is then performed on other instances of the KVS 814*b-c* as backups.

Under some circumstances, a physical VNF instance may be removed from the rVNF system. For example, a physical VNF instance may fail (stop working properly) or be scaled out of the system. In some embodiments, when a particular physical VNF instance is no longer part of the rVNF system, all keys pointing to the physical VNF instance may be reallocated to other physical VNF instances.

Figure 9:
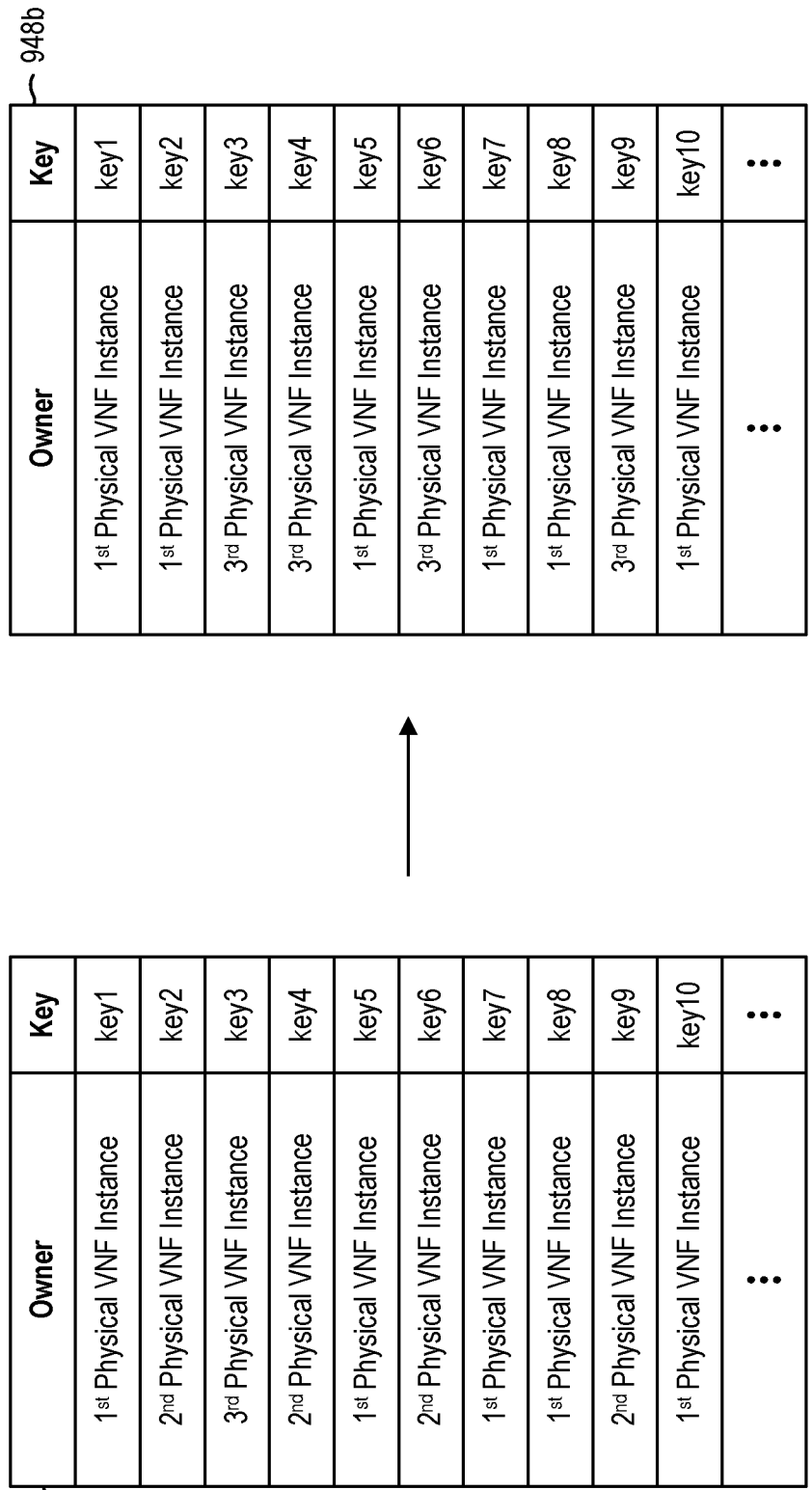
FIG. 9 illustrates an example of key reallocation after a physical VNF instance is removed from the rVNF system.

An example will be discussed in relation to FIG. 9, which shows an owner table 948*a* before key reallocation takes place and the owner table 948*b* after key reallocation has taken place. Referring to the owner table 948*a* before key reallocation takes place, it will be assumed that the ownership of the keys among the physical VNF instances is initially allocated as follows. The first physical VNF instance is initially the owner of key1, key5, key7, key8, and key10. The second physical VNF instance is initially the owner of key2, key4, key6, and key9. The third physical VNF instance is initially the owner of key3.

Suppose that the second physical VNF instance fails. In response, the ownership of the keys that are currently owned by the second physical VNF instance (namely, key2, key4, key6, and key9 in this example) may be reallocated. The owner table 948*b* indicates the ownership of the keys after this reallocation has been made. One of the keys that was previously owned by the second physical VNF interface (namely, key2) is now owned by the first physical VNF interface. Other keys that were previously owned by the second physical VNF interface (namely, key4, key6, and key9) are now owned by the third physical VNF interface.

In this example, the ownership of the keys is reallocated based at least in part on load information that is related to the physical VNF interfaces. Before the failure of the second physical VNF interface, the first physical VNF interface was more heavily loaded than the third physical VNF interface (the first physical VNF interface was the owner of five keys, whereas the third physical VNF interface was only the owner of a single key). Therefore, when the keys owned by the second physical VNF instance are reallocated, most of these keys are assigned to the third physical VNF interface because it is less heavily loaded.

Figure 10:
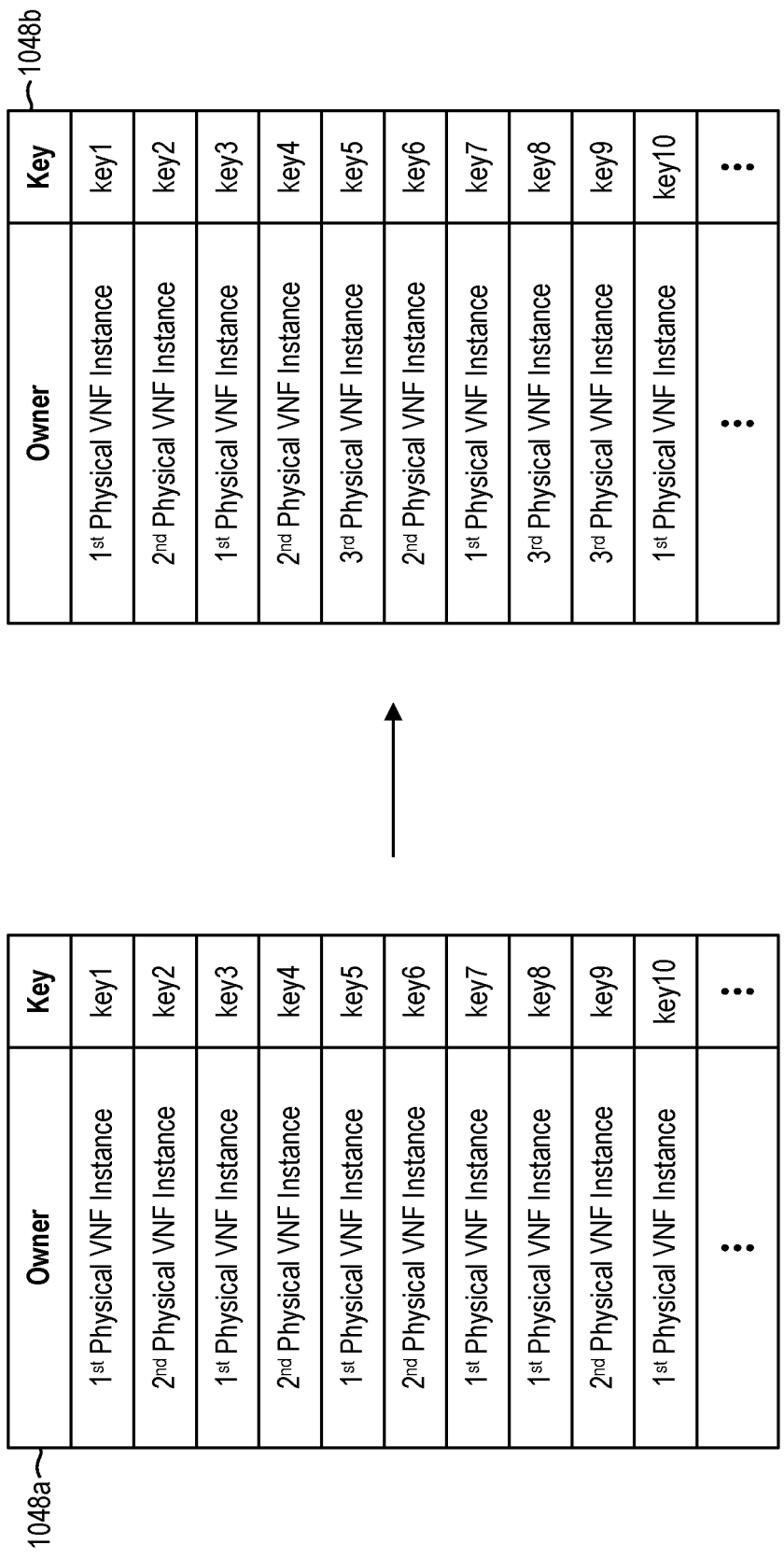
FIG. 10 illustrates an example of key reallocation in response to a new physical VNF instance being added to the rVNF system.

In some embodiments, when a new physical VNF instance is added, the ownership of some keys may be reallocated to the new physical VNF instance. An example will be discussed in relation to FIG. 10, which shows an owner table 1048*a* before key reallocation takes place and the owner table 1048*b* after key reallocation has taken place.

Referring to the owner table 1048*a* before key reallocation takes place, it will be assumed that the ownership of the keys among the physical VNF instances is initially allocated as follows. The first physical VNF instance is initially the owner of key1, key3, key5, key7, key8, and key10. The second physical VNF instance is initially the owner of key2, key4, key6, and key9.

Suppose that the third physical VNF instance is now added to the system. In response, the ownership of some keys may be reallocated to the newly added third physical VNF instance. The owner table 1048b indicates the ownership of the keys after this reallocation has been made. Two of the keys that were previously owned by the first physical VNF interface (namely, key5 and key8) are now owned by the third physical VNF interface. In addition, one of the keys that was previously owned by the second physical VNF interface (namely, key9) is now owned by the third physical VNF interface.

In this example, the ownership of the keys is reallocated based at least in part on load information that is related to the physical VNF interfaces. Before the third physical VNF interface is added, the first physical VNF interface was more heavily loaded than the second physical VNF interface. In particular, the first physical VNF interface was the owner of six keys, whereas the second physical VNF interface was only the owner of four keys. Therefore, when keys are allocated to the newly added third physical VNF instance, most of these keys are taken from the more heavily loaded first physical VNF interface.

When a physical VNF interface (or node) is added or removed, it is not necessary to modify the ownership table (as shown, for example, in FIGS. 9 and 10) directly. Instead, the routing table (as shown, for example, in the LB storage 318 in FIG. 3) can be updated so that requests are sent to different physical VNF interfaces. Subsequently, the physical VNF interfaces may themselves perform an ownership transfer. This relinquishes the LB of the requirement to manage ownerships directly. Thus, when ownership of one or more keys is reallocated, this may involve the LB updating the routing table and the affected physical VNF interfaces subsequently performing the appropriate ownership transfers.

The application storage (e.g., rVNF KVS) may facilitate transaction processing, ownership management, and failure detection and recovery. Transaction processing will be discussed initially. An rVNF KVS transaction typically starts with a reception of a packet from the rVNF LB interface. As discussed above, the packet also carries metadata, supplied by the LB, which identifies the context of the transaction.

The rVNF KVS may identify transactions based on calls to OS lock/unlock API. As most of the VNF appliances are already multi-threaded/multi-process, these locks are already inserted to protect implicit transactions. The packet metadata is also associated with the transaction, which simplifies lock management, as will be described later. Alternatively, the rVNF KVS may identify transactions through other mechanisms, including but not limited to explicitly annotating transactions.

A transaction starts with the first lock API call and finishes with the last unlock. There can be multiple nested locks during a single transaction. The transaction is committed when the last unlock happens. Alternatively, a programmer can explicitly annotate the code to mark a start and an end of a transaction.

Figure 11:
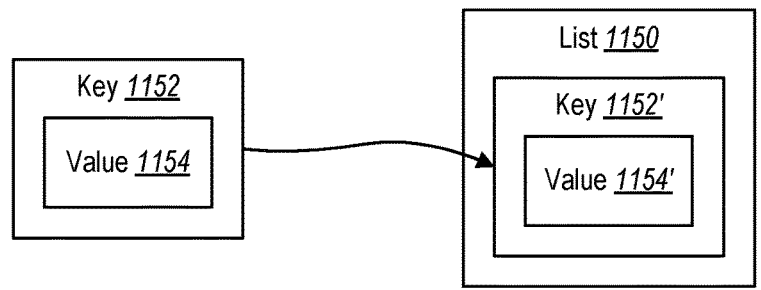
FIG. 11 illustrates an example showing the creation of local copies of accessed key and value pairs at the start of a transaction.

Reference is now made to FIG. 11. At the start of a transaction, an (initially) empty list 1150 of local copies of accessed key and value pairs is created. The first time an application accesses a key 1152, the key 1152 and its current value 1154 gets copied into the list 1150. FIG. 11 shows a copy 1152' of the key 1152 and a copy 1154' of the value 1154 in the list 1150. During the transaction, the application only modifies the copy in the list 1150 (represented by the key 1152' and the value 1154'). The original memory location (represented by the key 1152) remains unchanged so that the transaction can be rolled back. The next time the application accesses the same key in the same transaction, the application uses the already created copy of the key/value pair (represented by the key 1152' and the value 1154').

A single node can execute multiple transactions concurrently on multiple CPU cores. In some embodiments, concurrent transactions may not be allowed to access the same key. When a transaction accesses a key, the transaction writes its ID in the key's metadata. If a new transaction tries to access the same key and finds that a transaction has already acquired this key, it stalls and waits for the previous transaction to be finished.

To prevent this kind of waiting, the system may be configured to avoid scheduling transactions with the same metadata. Metadata may include an array of objects that represents different contexts. Before attempting to schedule a new transaction, the system may check all running transactions to determine whether any of them contain any of the metadata objects that are present with a candidate transaction. If they do, a new candidate transaction may be selected. Because of the nature of the requests, there will likely be many other incoming requests not accessing the same context, so opportunities for parallelism are unlikely to be missed.

For example, suppose that an rVNF application is processing a request with metadata R1={teid1, enb1} and it receives requests with the following meta-data: R2={teid1, enb1}, R3={teid2, enb1}, R4={teid3, enb2}. In some embodiments, the application will not schedule request R2 until request R1 is finished since they share the same metadata. It will also not schedule request R3 concurrent with R1 because R1 and R3 share a part of metadata (key enb2). It will accept to schedule requests R1 and R4 concurrently because there is no overlap in metadata keys.

At the end of a transaction, rVNF KVS backs up all modified keys and values to all other nodes (physical VNF instances). In some embodiments, all keys may be replicated on all nodes, particularly if the number of keys stored in the rVNF KVS is relatively small so that all can fit in the main memory. In alternative embodiments, there may be a limit to the number of replicas per key.

In some embodiments, once all backup nodes (physical VNF instances) acknowledge the transaction, the transaction is assumed to be successful. All the network responses are transmitted at this point, and the received packet is cleared from the socket. This makes it possible to maintain a reliability model that mandates the same behavior as if only network losses occurred. If a node fails during a transaction, the transaction may be repeated on a different node (e.g., in case of SCTP where the received packets have already been acknowledged), or ignored (e.g., in case of UDP, which would amount to the initial network packet loss). If a node fails after the transaction and before the network message, this would be equivalent to losing the response packet on the network.

A primary node does not need to validate the transaction once acknowledgements from all backups are received. The entire backup thus takes one round-trip time. Instead, all most recent backups are considered pending. Once a newer backup is committed, the previously pending backup is considered valid.

Figure 12:
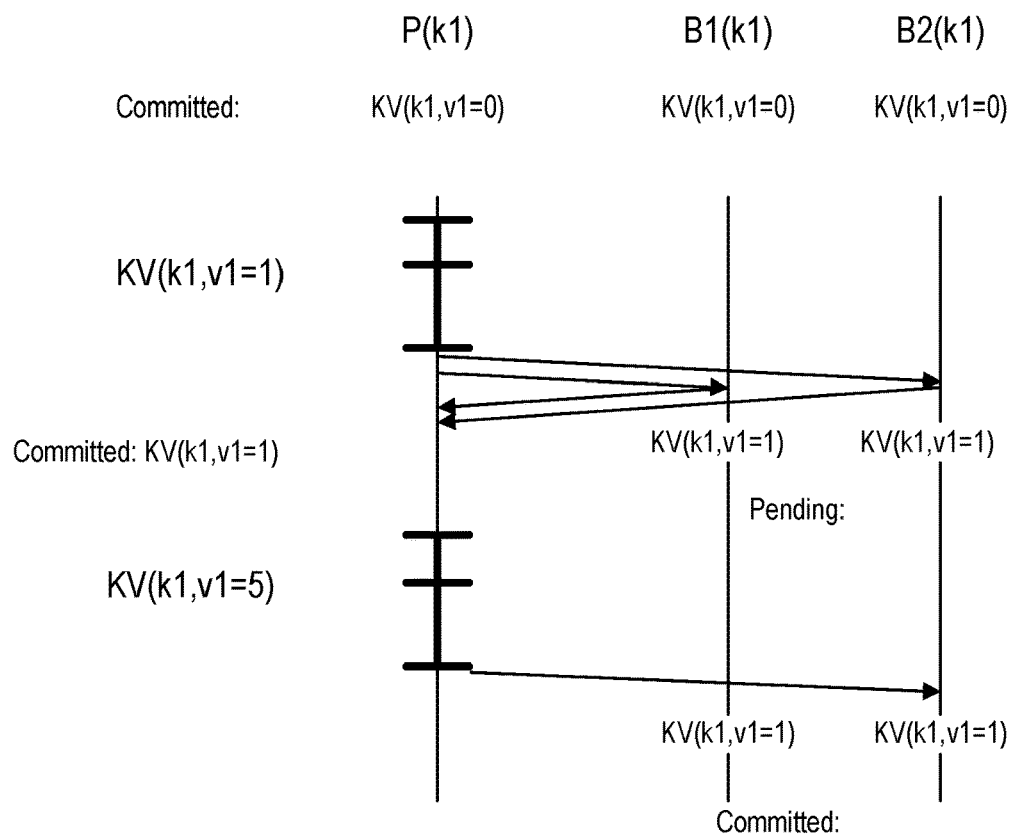
FIG. 12 illustrates an example of a backup process involving a primary node and two backup nodes with respect to a key.

FIG. 12 illustrates an example of a backup process involving a primary node (P) and two backup nodes (B1 and B2) with respect to a key k1. In this context, the term "node"

refers to a physical VNF instance. The value of k1 (represented by v1) is initially 0. As part of a transaction, the primary node P changes the value of k1 to 1. When the transaction is committed, the value of k1 is changed to 1 on B1 and B2. As part of a subsequent transaction, the primary node P changes the value of k1 to 5. However, the value of k1 remains 1 on B1 and B2 until this subsequent transaction is committed.

Metadata storage and processing will now be discussed. As discussed previously, rVNF LB and rVNF applications use metadata at various steps. This metadata can be stored both in the key-value store at LB and on the application side. In order to minimize latency and overhead, the metadata may be stored as close to the application as possible. For example, if a part of metadata is required for routing, that metadata may be stored at the LB KVS. Otherwise, that metadata may be stored at the application node. It is not necessary for metadata that stored at the application side to be replicated (although it may be). Metadata is used as a hint for performance optimization and does not affect the correctness of the execution. Any replication of metadata can reduce regular run-time performance. In case of failure, the new node relearns the metadata from new transactions.

Figure 13:
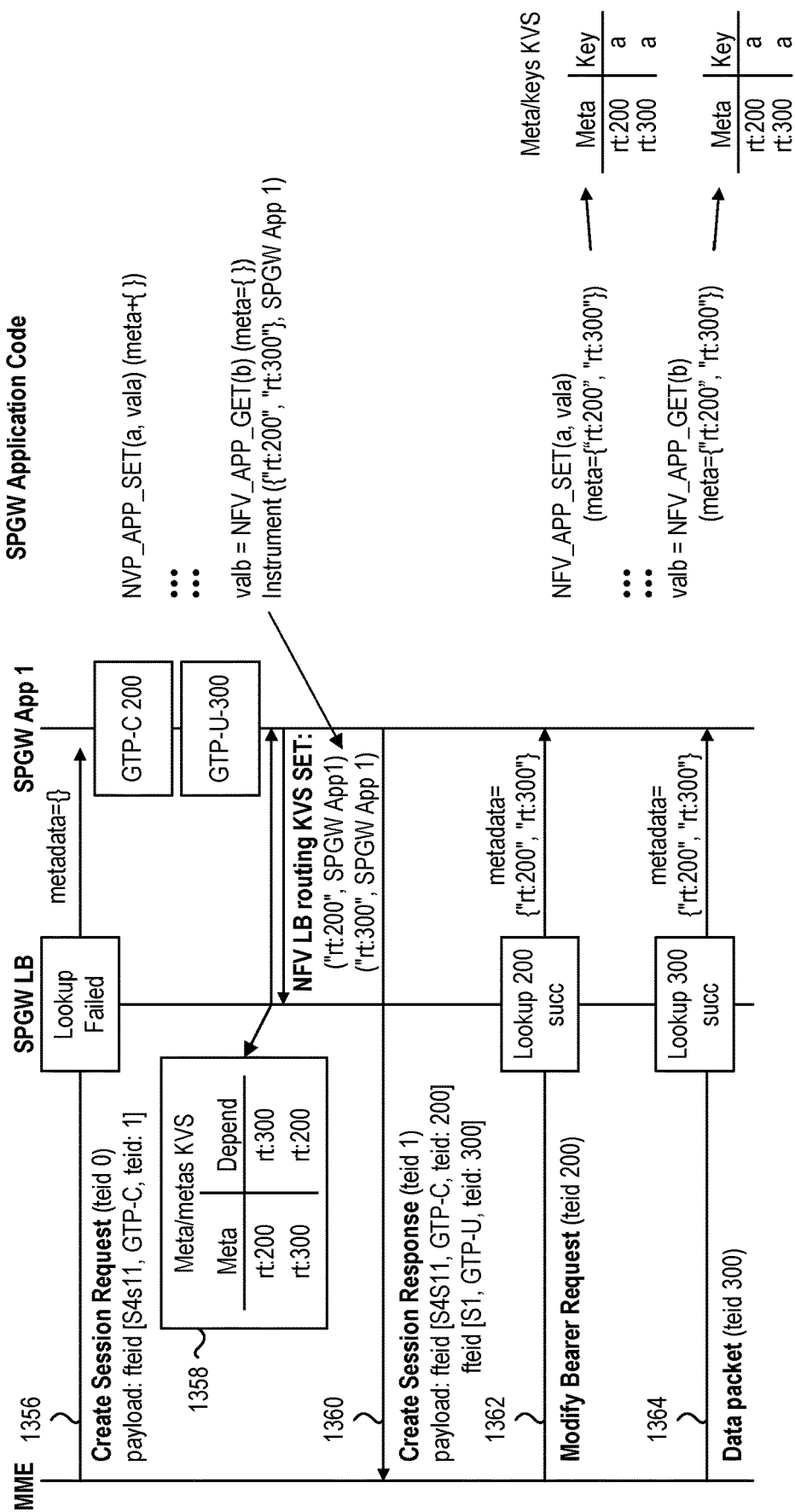
FIG. 13 illustrates an example of metadata processing for the GTP-C protocol.

An example of metadata processing for the GTP-C protocol is given in FIG. 13. This example will be discussed in relation to an MME (which is an example of a client 108) and an SPGW application (which is an example of a VNF application instance 102). The SPGW App 1 refers to a first instance of the SPGW application (e.g., a first physical VNF instance 104*a*). The SPGW LB is an example of the LB interface 110.

When the first packet comes, which is a create session request 1356 for a new session, there is no metadata in it so the lookup fails. The packet gets forwarded to any physical VNF instance. During the processing of the create session request 1356, the SPGW application code assigns GTP-C tunnel ID 200 and GTP-U tunnel ID 300 to the new session. The user then instruments the code to add two metadata ("rt:200" and "rt:300") to the routing KVS, and also register meta dependencies (meta/metas table 1358), all at the LB, implying that "rt:200" is likely to request the same keys as "rt:300" and vice versa. Each NFV_APP_SET/GET call automatically gets provided metadata from the packet call. For the first packet this metadata is empty. FIG. 13 shows a create session response 1360 being sent from the SPGW application to the MME.

The next packet from MME to SPGW, modify bearer request 1362, carries a teid 200 which is already in the LB routing KVS, so the packet gets correctly routed to SPGW App instance 1. When processing Modify bearer request, SPGW application now has the metadata ("rt:200" and "rt:300") provided by the application context, so the next time NFV_APP_SET/GET is called, the corresponding metadata and key are automatically added to the meta/keys table.

Next, a data packet 1364 comes with teid 300. Since "rt:300" is in the LB routing table, this packet gets routed to the correct LB instance. Here data path is used to illustrate how to link data from two different interfaces with different IDs, which is a common case in the control plane protocols. However, in practice it may not be desirable to use the rVNF framework for the data path, as the data path requires more performance.

If a new key is created during a transaction, which hasn't existed before, the ownership may not be registered immediately but only when the transaction is committed. This is to reduce the overhead when many new keys are created during a transaction. These keys will likely be unique and will not clash with other transactions. If they do, one of the contending transactions (randomly chosen) may be rolled back.

The changing of key ownership will next be discussed. Even with the LB guiding traffic, it will occasionally happen that key ownership should be changed. One example is a node failure, and another is scale in/out. It is important to notice that the LB and rVNF KVS do not have to be explicitly synchronized. If an LB sends a packet to a "wrong" application VNF node (the one that is not an owner), this node will request an ownership before processing it. If the routing change happens once, this will amount to the most optimal data reallocation. If the route switches several times, the system will still work correctly but will bear a performance penalty due to extra switching.

Figure 14:
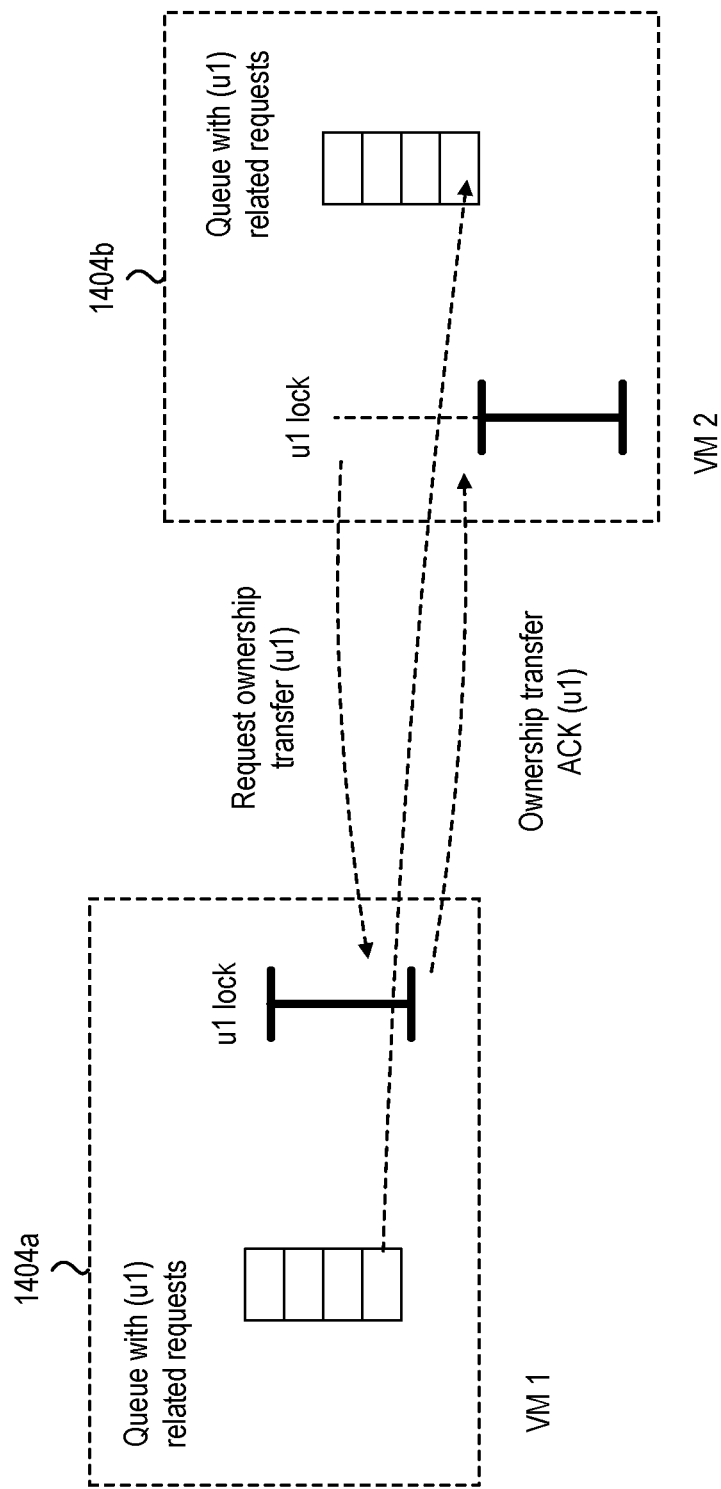
FIG. 14 illustrates an example showing a change in ownership of a key from one virtual machine (VM) to another.

A simple example of ownership change is illustrated in FIG. 14. Two VMs are shown, VM1 1404*a* and VM2 1404*b*. These VMs 1404*a-b* are examples of physical VNF instances. In the depicted example, VM2 1404*b* wants to lock the same key as VM1 1404*a*. Since VM1 1404*a* is the owner, VM2 1404*b* cannot start the transaction. Therefore, VM2 1404*b* first requests an ownership transfer, and proceeds with the transaction once the ownership transfer is granted. In this case, the ownership transfer is delayed until the ongoing transaction on VM1 1404*a* is finished.

Two further optimizations of ownership transfers will now be described. First, each ownership transfer request also contains metadata pertaining to the network request that initiated the ownership change. When an owner receives an ownership request from another node (e.g., through the non-transactional KVS, as described below), it will first check if there is a locally queued request containing a subset of the same metadata. If there is, the owner will first process all the relevant requests before relinquishing the ownership. This will reduce bouncing of ownerships across nodes that may process the same key.

Second, every time an ownership change request is executed for a key at the non-transactional KVS, the key may be logged with the metadata objects. A list may be maintained of all metadata objects in a key-value store, and the key may be added to all pertaining metadata objects each time an ownership change is requested. The list may be updated on any further ownership change by adding or removing keys. This allows ownership of all keys to be changed proactively once the first key ownership is requested.

To illustrate this, reference is made again to the example shown in FIG. 13. Imagine that at the end of the example a system scales in/out and that the destination for "rt:300" changes. This means that the LB changes the routing decision for the "rt:300" key, and all the depending keys (in this case "rt:200"). Suppose they now point to SPGW application instance 2. When application instance 2 receives a request, it will start processing it, and likely require access NFV_APP_SET(a, vala) as previous code did. Before accessing, application instance 2 will request the ownership of key a from LB, which will in turn request it from instance 1. The ownership request will also contain the relevant metadata ("rt:200" and "rt:300" in this case), and instance 1 will now change ownership not only for key a, as requested, but also for all other keys linked to the metadata (key b in this case).

Proactively changing ownership does not affect correctness as a wrong change only affects performance. But proactively changing ownership can substantially reduce latency. If a transaction does 10 reads and each read requires an ownership change, this can take as long as 500 us (assuming a single ownership change takes 50 us). However, if all of them are batched together, the latency is reduced 10×. This is particularly useful when a user context is moved from one physical location to another (e.g. from an edge location to a datacenter), where each ownership change is very expensive due to high round-trip delay time.

Key ownership may be managed by the non-transactional KVS on an rVNF socket. In some embodiments, an application VNF can supply packet metadata along with a request for an ownership.

Figure 15:
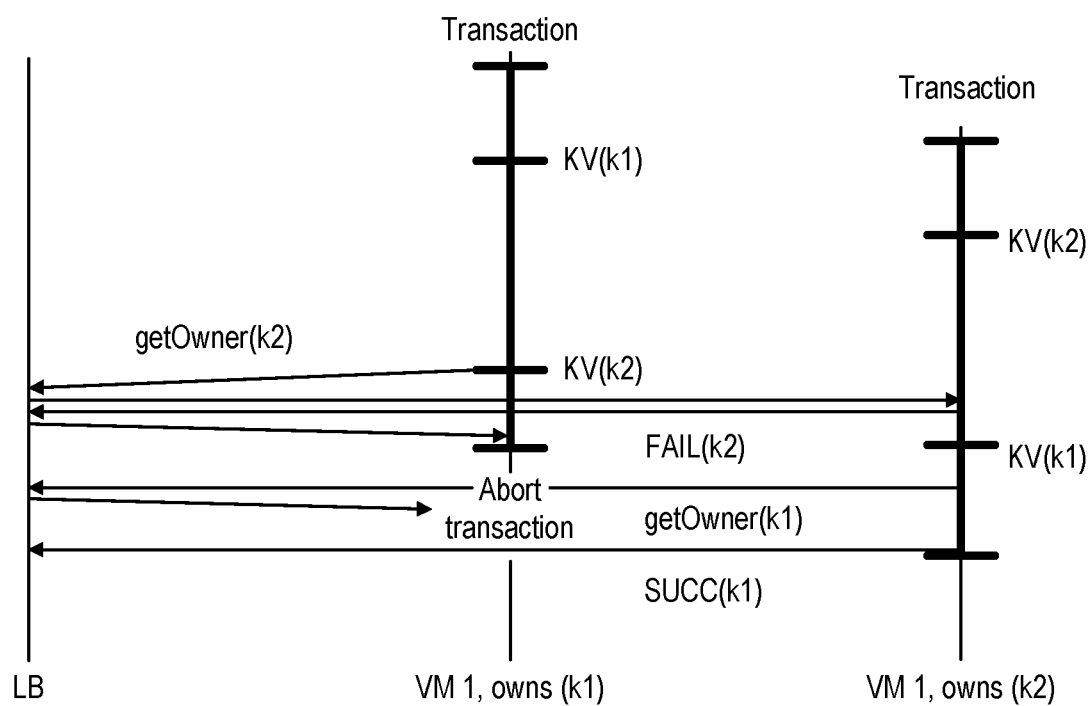
FIG. 15 illustrates an example showing a scenario in which two transactions request ownership of keys in a different order.

In certain cases two transactions can require different ownerships in different orders, as illustrated in FIG. 15. In this case, two nodes ask for ownership of k1 and k2 in a different order, a scenario that would normally cause a deadlock. To resolve this problem, one of the two transactions may be aborted and the other one may be continued. In general, all cases of potential deadlocks may be resolved by failing one or all of the participating transactions. However, it is unlikely that these situations would occur very often as most transactions open a very few locks in the same order (otherwise, the underlying multi-threaded code could yield deadlocks).

Failure detection and recovery will now be discussed. Similar to the ownership management, rVNF KVS relies on rVNF LB and its non-transactional KVS to manage its group membership and recovery protocols. All rVNF KVS instances report their health regularly to the rVNF LB and rVNF maintains a consistent group membership. If an application VM instance 1 cannot reach application VNF instance 2 for some time, to execute a backup, it will report the failure to the rVNF LB. The rVNF LB then has to decide which of the two instances to remove from the group membership.

Once the rVNF system removes an application instance from a group membership, it informs all other rVNF KVS instances about it. The rVNF system also stops forwarding messages and will ignore further ownership requests from that instance. This will effectively isolate the suspected instance and immediately prevent it from further activities.

In some embodiments, all instances back up all keys. Alternatively, one could select which keys to backup where. In this case, one would need to pick additional backup nodes for the keys that were backed up on the node that was removed from the group, to maintain the same number of replicas for each key.

Once a node fails, the values of keys for which it was a primary should be recovered. All of the most recent backups are typically pending. If all backup replicas of a key have the same transaction ID, this value may be used as being valid. If not, the highest transaction ID may be used.

Figure 16:
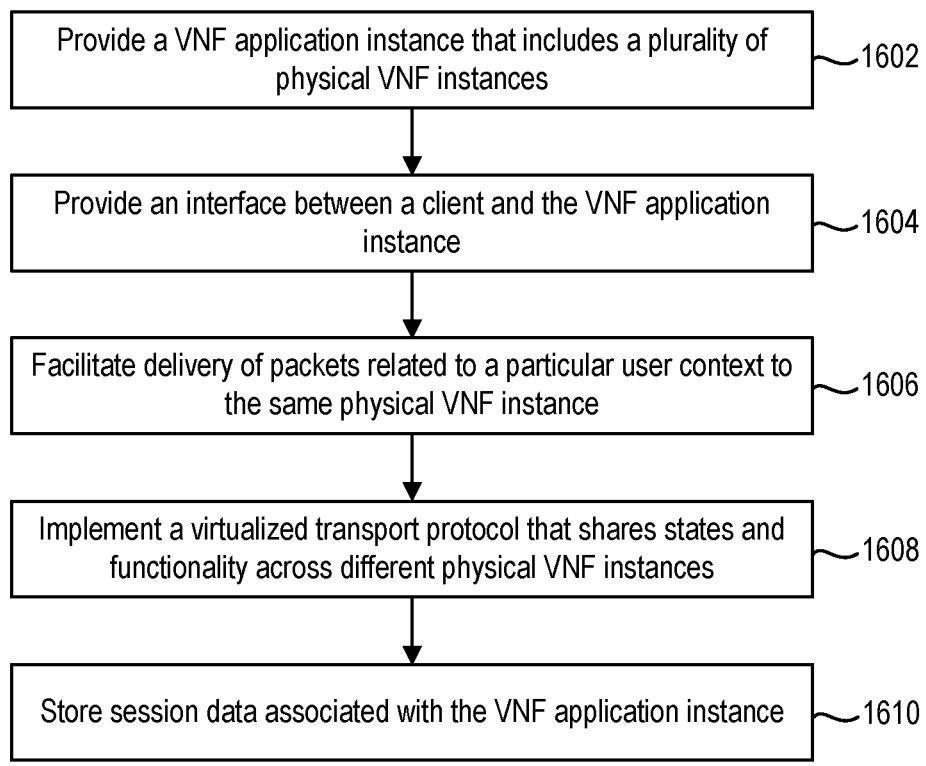
FIG. 16 illustrates an example of a method for providing a network function virtualization system for a cloud computing system.

FIG. 16 illustrates an example of a method 1600 for providing a network function virtualization system for a cloud computing system. The method 1600 will be discussed in relation to the rVNF system 100 shown in FIG. 1.

Step 1602 represents providing a virtualized network function (VNF) application instance 102 that includes a plurality of physical VNF instances 104a-c. The VNF application instance 102 may implement one or more functions associated with a cellular control plane. The physical VNF instances 104a-c may be, for example, virtual machines (VMs), containers, or combinations thereof.

Step 1604 represents providing an interface between a client 108 and the VNF application instance 102. In the rVNF system 100 shown in FIG. 1, this interface is provided by the load balancer 106.

Step 1606 represents facilitating delivery of packets related to a particular user context to the same physical VNF instance. In the rVNF system 100 shown in FIG. 1, this functionality is provided by the LB interface 110. As discussed above, packets that arrive at the LB interface 110 may include metadata that identifies a particular user context. The LB interface 110 may utilize storage (e.g., LB storage 310, which may be implemented as a non-transactional KVS) to store associations between metadata that is included in received packets and particular physical VNF instances.

Step 1608 represents implementing a virtualized transport protocol that shares states and functionality across different physical VNF instances 104a-c. In the rVNF system 100 shown in FIG. 1, this functionality is provided by the socket interface 112.

Step 1610 represents storing session data associated with the VNF application instance 102. In the rVNF system 100 shown in FIG. 1, this functionality is provided by the application storage 114. As discussed above, in some embodiments the application storage 114 may be implemented as a transactional KVS.

An rVNF system in accordance with the present disclosure, including rVNF sockets and rVNF application storage (e.g., rVNF KVS), may be provided as platform services for a cloud computing system, with standard interfaces that will allow multiple VNF vendors to interface different types of control plane VNFs (e.g., AMF, SMF, MME, SGW-C, PGW-C, HSS, PCRF, P-CSCF, S-CSCF, I-CSCF). By interfacing VNFs with cloud computing platform elements, a VNF instance that is compliant with a cloud computing system can be created. This could provide a number of benefits.

For example, a standard VNF, connected to a VNF that is compliant with a cloud computing system, will not be able to perceive a failure of one or a limited number of components at the same time. Any failure will only potentially manifest itself as a temporary "network" failure, with a few packets lost on the network (which will be naturally retransmitted by current transport and application layer protocols).

As another example, a VNF that is compliant with a cloud computing system will be able to scale up and down by adding and removing several physical VNF instances (e.g., VMs, containers) without externally connected standard VNFs observing any change in behavior. By providing fast KVS and socket layers, however, the performance of a single VNF instance will be comparable to its standalone counterpart.

Another potential benefit is that by abstracting the network and memory interfaces, a network orchestrator will be able to seamlessly allocate and reallocate different physical VNF instances on different parts of a cloud computing platform.

Figure 17:
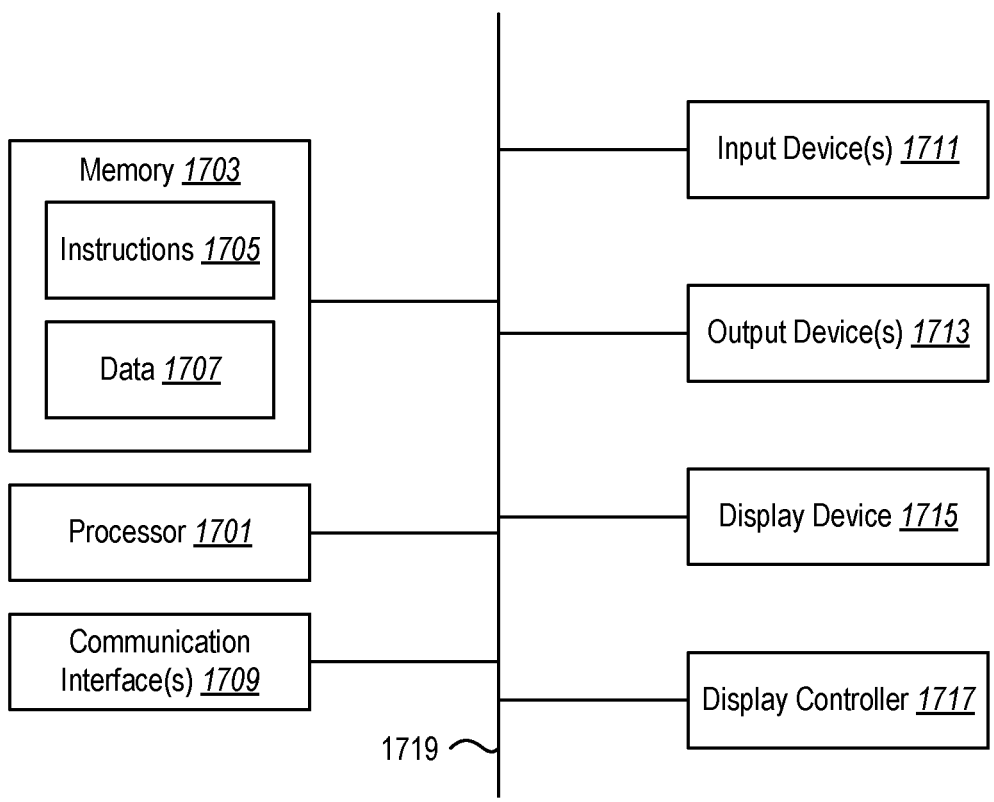
FIG. 17 illustrates certain components that may be included within a computer system.

FIG. 17 illustrates certain components that may be included within a computer system 1700. One or more computer systems 1700 may be used to implement the various devices, components, and systems described herein.

The computer system 1700 includes a processor 1701. The processor 1701 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1701 may be referred to as a central processing unit (CPU). Although just a single processor 1701 is shown in the computer system 1700 of FIG. 17, in an alternative configuration, a combination of processors (e.g., an ARM and DSP) could be used.

The computer system 1700 also includes memory 1703 in electronic communication with the processor 1701. The memory 1703 may be any electronic component capable of storing electronic information. For example, the memory 1703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1705 and data 1707 may be stored in the memory 1703. The instructions 1705 may be executable by the processor 1701 to implement some or all of the steps, operations, actions, or other functionality disclosed herein. Executing the instructions 1705 may involve the use of the data 1707 that is stored in the memory 1703. Any of the various examples of modules and components described herein may be implemented, partially or wholly, as instructions 1705 stored in memory 1703 and executed by the processor 1701. Any of the various examples of data described herein may be among the data 1707 that is stored in memory 1703 and used during execution of the instructions 1705 by the processor 1701.

A computer system 1700 may also include one or more communication interfaces 1709 for communicating with other electronic devices. The communication interface(s) 1709 may be based on wired communication technology, wireless communication technology, or both. Some examples of communication interfaces 1709 include a Universal Serial Bus (USB), an Ethernet adapter, a wireless adapter that operates in accordance with an Institute of Electrical and Electronics Engineers (IEEE) 1702.11 wireless communication protocol, a Bluetooth® wireless communication adapter, and an infrared (IR) communication port.

A computer system 1700 may also include one or more input devices 1711 and one or more output devices 1713. Some examples of input devices 1711 include a keyboard, mouse, microphone, remote control device, button, joystick, trackball, touchpad, and lightpen. Some examples of output devices 1713 include a speaker and a printer. One specific type of output device that is typically included in a computer system 1700 is a display device 1715. Display devices 1715 used with embodiments disclosed herein may utilize any suitable image projection technology, such as liquid crystal display (LCD), light-emitting diode (LED), gas plasma, electroluminescence, or the like. A display controller 1717 may also be provided, for converting data 1707 stored in the memory 1703 into text, graphics, and/or moving images (as appropriate) shown on the display device 1715.

The various components of the computer system 1700 may be coupled together by one or more buses, which may include a power bus, a control signal bus, a status signal bus, a data bus, etc. For the sake of clarity, the various buses are illustrated in FIG. 17 as a bus system 1719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A reliable network function virtualization (rVNF) system for a cloud computing system, comprising:
    a virtualized network function (VNF) application instance that comprises a plurality of physical VNF instances;
    a load balancer that provides an interface between a client and the VNF application instance;
    a communication interface that facilitates communication between the client and the VNF application instance;
    application storage that stores session data associated with the VNF application instance; and
    a load balancer interface that is configured to:
        extract metadata from a plurality of incoming packets;
        search for the metadata in load balancer storage;
        determine whether an association is found in the load balancer storage between the metadata in an incoming packet and an associated physical VNF instance of the plurality of physical VNF instances;
        when the association is found, forward the incoming packet to the associated physical VNF instance; and
        when the association is not found, select a forwarding physical VNF instance of the plurality of physical VNF instances to forward the incoming packet to, wherein the forwarding physical VNF instance writes, in the load balancer storage, a new association between the metadata and the forwarding physical VNF instance.

2. The rVNF system of claim 1, wherein the load balancer and the application storage are replicated on each of the plurality of physical VNF instances.

3. The rVNF system of claim 1, wherein the physical VNF instances insert routing entries into the load balancer storage.

4. The rVNF system of claim 1, wherein the application storage facilitates transaction processing, ownership management, and failure detection and recovery.

5. The rVNF system of claim 1, wherein:
the application storage comprises a key-value store that comprises a plurality of key-value pairs; and
different values in the key-value store have different sizes.

6. The rVNF system of claim 5, wherein:
keys in the key-value store comprise memory addresses; and
a value corresponding to a particular key is stored in a section of memory corresponding to a memory address that the particular key represents.

7. The rVNF system of claim 1, wherein:
the application storage comprises a key-value store;
each key has only one physical VNF instance as an owner at any given time;
only the owner of a key is permitted to access the key and a value corresponding to the key; and
when the owner performs a write operation to a key-value pair, the write operation is replicated to other instances of the key-value store as backups.

8. The rVNF system of claim 1, wherein in response to detecting that a particular physical VNF instance is no longer part of the rVNF system, ownership of all keys pointing to the particular physical VNF instance are reallocated to other physical VNF instances.

9. The rVNF system of claim 8, wherein the reallocation of the ownership of all keys is based at least in part on load information related to the plurality of physical VNF instances.

10. The rVNF system of claim 1, wherein in response to detecting that a new physical VNF instance has been added, the load balancer interface reallocates ownership of some keys to the new physical VNF instance.

11. The rVNF system of claim 10, wherein the reallocation of the ownership of some keys is based at least in part on load information related to the plurality of physical VNF instances.

12. The rVNF system of claim 1, wherein:
the communication interface comprises a plurality of transport protocol application instances; and
a transport protocol state is replicated across the plurality of transport protocol application instances.

13. The rVNF system of claim 12, further comprising a plurality of load balancers that deliver packets to different transport protocol application instances based on metadata in the packets so that all packets from the same flow are delivered to the same transport protocol application instance.

14. A reliable network function virtualization (rVNF) system for a cloud computing system, comprising:
a virtualized network function (VNF) application instance that comprises a plurality of physical VNF instances;
a load balancer that provides an interface between a client and the VNF application instance;
a load balancer interface that facilitates delivery of packets related to a particular user context to the same physical VNF instance;
a communication interface that facilitates communication between the client and the VNF application instance; and
application storage comprising a key-value store that includes a plurality of key-value pairs for storing session data associated with the VNF application instance, wherein each key has only one physical VNF instance as an owner at any given time, and wherein only the owner of a key is permitted to access the key and adjust a value corresponding to the key.

15. The rVNF system of claim 14, wherein in response to receiving an incoming packet the load balancer interface:
parses the incoming packet and extracts metadata from the incoming packet;
searches for the metadata in load balancer storage and identifies a physical VNF instance that is associated with the metadata; and
forwards the incoming packet to the identified physical VNF instance.

16. The rVNF system of claim 14, wherein in response to receiving an incoming packet the load balancer interface:
parses the incoming packet and extracts metadata from the incoming packet;
searches unsuccessfully for the metadata or a subset of the metadata in load balancer storage;
identifies a physical VNF instance that should receive the incoming packet based on load information associated with the plurality of physical VNF instances;
forwards the incoming packet to the identified physical VNF instance; and
associates the metadata with the identified physical VNF instance in the load balancer storage.

17. The rVNF system of claim 14, wherein:
the load balancer interface comprises load balancer storage; and
the physical VNF instances insert routing entries into the load balancer storage.

18. The rVNF system of claim 14, wherein the application storage facilitates transaction processing, ownership management, and failure detection and recovery.

19. The rVNF system of claim 14, wherein in response to detecting that a physical VNF instance is no longer part of the rVNF system, ownership of all keys pointing to the physical VNF instance are reallocated to other physical VNF instances.

20. A method implemented on load balancer interface implemented on a reliable network function virtualization (rVNF) system for a cloud computing system, the method comprising:
extracting metadata from a plurality of incoming packets;
searching for metadata in a load balancer storage of a load balancer that provides an interface between a client and a virtualized network function (VNF) application instance, the VNF application instance comprising a plurality of physical VNF instances;
determining whether an association is found in the load balancer storage between the metadata in an incoming packet of the plurality of incoming packets and an associated physical VNF instance of the plurality of physical VNF instances;
when the association is found, forwarding the incoming packet to the associated physical VNF instance; and
when the association is not found, selecting a forwarding physical VNF instance of the plurality of physical VNF instances to forward the incoming packet to, wherein the forwarding physical VNF instance writes, in the load balancer storage, a new association between the metadata and the forwarding physical VNF instance.

\* \* \* \* \*